(12) United States Patent
Kaschmitter et al.

(10) Patent No.: US 7,968,250 B2
(45) Date of Patent: Jun. 28, 2011

(54) FUEL CARTRIDGE CONNECTIVITY

(75) Inventors: James L. Kaschmitter, Pleasanton, CA (US); Ian W Kaye, Livermore, CA (US); William R. Di Scipio, Fremont, CA (US)

(73) Assignee: UltraCell Corporation, Livermore, CA (US)

( * ) Notice: Subject to any disclaimer, the term of this patent is extended or adjusted under 35 U.S.C. 154(b) by 1268 days.

(21) Appl. No.: 11/316,216

(22) Filed: Dec. 21, 2005

(65) Prior Publication Data

US 2006/0127733 A1    Jun. 15, 2006

Related U.S. Application Data

(60) Provisional application No. 60/638,421, filed on Dec. 21, 2004, provisional application No. 60/649,638, filed on Feb. 2, 2005, provisional application No. 60/677,424, filed on May 2, 2005, provisional application No. 60/682,598, filed on May 18, 2005.

(51) Int. Cl.
*H01M 2/36* (2006.01)
*H01M 8/02* (2006.01)

(52) U.S. Cl. .......................... 429/515; 429/506

(58) Field of Classification Search .................. None
See application file for complete search history.

(56) References Cited

U.S. PATENT DOCUMENTS

| | | |
|---|---|---|
| 4,524,609 A | 6/1985 | Sharp |
| 4,615,455 A | 10/1986 | Tansill |
| 4,889,189 A | 12/1989 | Rozniecki |
| 5,081,095 A | 1/1992 | Bedford et al. |
| 5,522,428 A | 6/1996 | Duvall |
| 5,525,436 A | 6/1996 | Savinell et al. |
| 5,534,328 A | 7/1996 | Ashmead et al. |
| 5,601,938 A | 2/1997 | Mayer et al. |
| 5,611,214 A | 3/1997 | Wegeng et al. |
| 5,641,585 A | 6/1997 | Lessing et al. |
| 5,716,727 A | 2/1998 | Savinell et al. |
| 5,789,093 A | 8/1998 | Malhi |
| 5,811,062 A | 9/1998 | Wegeng et al. |
| 5,908,141 A | 6/1999 | Teel |
| 5,961,930 A | 10/1999 | Chatterjee et al. |
| 5,961,932 A | 10/1999 | Ghosh et al. |
| 6,057,051 A | 5/2000 | Uchida et al. |

(Continued)

FOREIGN PATENT DOCUMENTS

DE    19841993    3/2000

(Continued)

OTHER PUBLICATIONS

S. Ahmed et al., "Catalytic Partial Oxidation Reforming of Hydrocarbon Fuels", Nov. 16-19, 1998, 1998 Fuel Cell Seminar, Palm Springs, CA.

(Continued)

*Primary Examiner* — Keith Walker
(74) *Attorney, Agent, or Firm* — Beyer Law Group LLP

(57) ABSTRACT

The invention relates to a portable cartridge that stores a fuel for use with a fuel cell system. Cartridges described herein improve mechanical interface between a cartridge and a device that couples to the cartridge. The interface may include one or more of: a sliding interface between a cartridge and device, a latching interface that holds the cartridge in one or more positions relative to the device, and/or keyed access and security features that prevent unintended access to the fuel. Multiple valves may also be included to further control access to the fuel.

15 Claims, 14 Drawing Sheets

U.S. PATENT DOCUMENTS

| | | | |
|---|---|---|---|
| 6,077,620 | A | 6/2000 | Pettit |
| 6,080,501 | A | 6/2000 | Kelley et al. |
| 6,193,501 | B1 | 2/2001 | Masel et al. |
| 6,200,536 | B1 | 3/2001 | Tonkovich et al. |
| 6,245,214 | B1 | 6/2001 | Rehg et al. |
| 6,258,154 | B1 | 7/2001 | Berndt et al. |
| 6,265,093 | B1 | 7/2001 | Surampudi et al. |
| 6,268,077 | B1 | 7/2001 | Kelley et al. |
| 6,280,865 | B1 | 8/2001 | Eisman et al. |
| 6,312,846 | B1 | 11/2001 | Marsh |
| 6,406,808 | B1 | 6/2002 | Pratt et al. |
| 6,415,860 | B1 | 7/2002 | Kelly et al. |
| 6,423,434 | B1 | 7/2002 | Pratt et al. |
| 6,447,945 | B1 | 9/2002 | Streckert et al. |
| 6,460,733 | B2 | 10/2002 | Acker et al. |
| 6,465,119 | B1 | 10/2002 | Koripella et al. |
| 6,470,569 | B1 | 10/2002 | Lippert et al. |
| 6,479,920 | B1 | 11/2002 | Lal et al. |
| 6,506,513 | B1 | 1/2003 | Yonetsu et al. |
| 6,537,506 | B1 | 3/2003 | Schwalbe et al. |
| 6,541,676 | B1 | 4/2003 | Franz et al. |
| 6,569,553 | B1 | 5/2003 | Koripella et al. |
| 6,613,972 | B2 | 9/2003 | Cohen et al. |
| 6,630,518 | B1 | 10/2003 | Paronen |
| 6,638,654 | B2 | 10/2003 | Jankowski et al. |
| 6,660,421 | B2 | 12/2003 | Merin Celemin et al. |
| 6,660,423 | B2 | 12/2003 | Neutzler et al. |
| 6,673,130 | B2 | 1/2004 | Jankowski et al. |
| 6,673,742 | B2 | 1/2004 | Abdo et al. |
| 6,677,070 | B2 | 1/2004 | Kearl |
| 6,696,195 | B2 | 2/2004 | Pavio et al. |
| 6,713,201 | B2 | 3/2004 | Bullock et al. |
| 6,727,479 | B2 | 4/2004 | Villa et al. |
| 6,739,578 | B2 | 5/2004 | Barton et al. |
| 6,746,960 | B2 | 6/2004 | Goodman |
| 6,753,036 | B2 | 6/2004 | Jankowski et al. |
| 6,766,817 | B2 | 7/2004 | da Silva |
| 6,777,118 | B2 | 8/2004 | Shioya |
| 6,785,616 | B2 | 8/2004 | Lung et al. |
| 6,789,421 | B2 | 9/2004 | Gore et al. |
| 6,794,067 | B1 | 9/2004 | Acker et al. |
| 6,808,833 | B2 | 10/2004 | Johnson |
| 6,815,110 | B2 | 11/2004 | Marsh |
| 6,821,666 | B2 | 11/2004 | Morse et al. |
| 6,824,905 | B2 | 11/2004 | Shioya et al. |
| 6,828,049 | B2 | 12/2004 | Bullock et al. |
| 6,835,488 | B2 | 12/2004 | Sasahara et al. |
| 6,872,486 | B2 | 3/2005 | Srinivasan et al. |
| 6,878,480 | B2 | 4/2005 | Ruhl et al. |
| 6,885,298 | B2 | 4/2005 | Everson et al. |
| 6,887,596 | B2 | 5/2005 | Leban |
| 6,913,998 | B2 | 7/2005 | Jankowski et al. |
| 6,916,565 | B2 | 7/2005 | Shioya |
| 6,921,593 | B2 | 7/2005 | Pan et al. |
| 6,921,603 | B2 | 7/2005 | Morse et al. |
| 6,924,054 | B2 | 8/2005 | Prasad et al. |
| 6,926,852 | B2 | 8/2005 | Satou et al. |
| 6,939,632 | B2 | 9/2005 | Arana et al. |
| 6,955,863 | B2 | 10/2005 | Bean et al. |
| 6,960,235 | B2 | 11/2005 | Morse et al. |
| 6,960,403 | B2 | 11/2005 | Morse et al. |
| 6,994,932 | B2 | 2/2006 | Kinkelaar et al. |
| 6,998,185 | B2 | 2/2006 | Gore et al. |
| 7,004,207 | B2 | 2/2006 | Finkelshtain et al. |
| 7,010,972 | B2 | 3/2006 | Kaye et al. |
| 7,059,582 | B2 | 6/2006 | Adams et al. |
| 7,074,511 | B2 | 7/2006 | Becerra et al. |
| 7,077,643 | B2 | 7/2006 | Holladay et al. |
| 7,093,623 | B2 | 8/2006 | Soucy |
| 7,099,018 | B2 | 8/2006 | Adams |
| 7,105,245 | B2 | 9/2006 | Ohlsen et al. |
| 7,115,335 | B2 | 10/2006 | Eggum |
| 7,128,106 | B2 | 10/2006 | Becerra et al. |
| 7,156,131 | B2 | 1/2007 | Adams et al. |
| 7,158,375 | B2 | 1/2007 | Kornmayer |
| 7,159,130 | B2 | 1/2007 | Koo |
| 7,169,489 | B2 | 1/2007 | Redmond |
| 7,172,825 | B2 | 2/2007 | Adams et al. |
| 7,241,523 | B1 | 7/2007 | Arikara et al. |
| 2001/0028965 | A1 | 10/2001 | Boneberg et al. |
| 2001/0029974 | A1 | 10/2001 | Cohen et al. |
| 2001/0045364 | A1 | 11/2001 | Hockaday et al. |
| 2002/0012825 | A1 | 1/2002 | Sasahara et al. |
| 2002/0018925 | A1 | 2/2002 | Merin Celemin et al. |
| 2002/0045082 | A1 | 4/2002 | Marsh |
| 2002/0048698 | A1 | 4/2002 | Fronk |
| 2002/0076599 | A1 | 6/2002 | Neutzler et al. |
| 2002/0081468 | A1 | 6/2002 | Shioya |
| 2002/0094462 | A1 | 7/2002 | Shioya et al. |
| 2002/0098119 | A1 | 7/2002 | Goodman |
| 2002/0106540 | A1 | 8/2002 | Shioya |
| 2002/0114984 | A1 | 8/2002 | Edlund et al. |
| 2002/0127141 | A1 | 9/2002 | Acker |
| 2002/0127451 | A1 | 9/2002 | Cao et al. |
| 2002/0131915 | A1 | 9/2002 | Shore et al. |
| 2002/0132156 | A1 | 9/2002 | Ruhl et al. |
| 2002/0147107 | A1 | 10/2002 | Abdo et al. |
| 2002/0150804 | A1 | 10/2002 | Srinivasan et al. |
| 2002/0154915 | A1 | 10/2002 | Bullock et al. |
| 2002/0155335 | A1 | 10/2002 | Kearl |
| 2002/0182459 | A1 | 12/2002 | Hockaday et al. |
| 2002/0192537 | A1 | 12/2002 | Ren |
| 2003/0006668 | A1 | 1/2003 | Lal et al. |
| 2003/0027022 | A1 | 2/2003 | Arana et al. |
| 2003/0031910 | A1 | 2/2003 | Satou et al. |
| 2003/0031913 | A1 | 2/2003 | Pavio et al. |
| 2003/0041899 | A1 | 3/2003 | Frank |
| 2003/0057199 | A1 | 3/2003 | Villa et al. |
| 2003/0064258 | A1 | 4/2003 | Pan et al. |
| 2003/0077495 | A1 | 4/2003 | Scartozzi et al. |
| 2003/0082416 | A1 | 5/2003 | Bullock et al. |
| 2003/0082422 | A1 | 5/2003 | Koschany |
| 2003/0082426 | A1 | 5/2003 | Bullock et al. |
| 2003/0082427 | A1 | 5/2003 | Prasad et al. |
| 2003/0091502 | A1 | 5/2003 | Holladay et al. |
| 2003/0103878 | A1 | 6/2003 | Morse et al. |
| 2003/0129464 | A1 | 7/2003 | Becerra et al. |
| 2003/0131663 | A1 | 7/2003 | Gore et al. |
| 2003/0134162 | A1 | 7/2003 | Gore et al. |
| 2003/0136453 | A1 | 7/2003 | Johnson |
| 2003/0138676 | A1 | 7/2003 | Leban |
| 2003/0138679 | A1 | 7/2003 | Prased et al. |
| 2003/0143444 | A1 | 7/2003 | Liu et al. |
| 2003/0157389 | A1 | 8/2003 | Kornmayer |
| 2003/0194363 | A1 | 10/2003 | Koripella |
| 2003/0205285 | A1 | 11/2003 | Kelly et al. |
| 2003/0235731 | A1 | 12/2003 | Haltiner, Jr. et al. |
| 2004/0001989 | A1 | 1/2004 | Kinkelaar et al. |
| 2004/0009381 | A1 | 1/2004 | Sakai et al. |
| 2004/0013927 | A1 | 1/2004 | Lawrence et al. |
| 2004/0043273 | A1 | 3/2004 | Jankowski et al. |
| 2004/0048128 | A1 | 3/2004 | Jankowski et al. |
| 2004/0062965 | A1 | 4/2004 | Morse et al. |
| 2004/0072046 | A1 | 4/2004 | Schmidt |
| 2004/0081884 | A1 | 4/2004 | Bean et al. |
| 2004/0086755 | A1 | 5/2004 | Kalal |
| 2004/0096714 | A1 | 5/2004 | Bette et al. |
| 2004/0096721 | A1 | 5/2004 | Ohlsen et al. |
| 2004/0146769 | A1 | 7/2004 | Birschbach |
| 2004/0151962 | A1 | 8/2004 | Adams |
| 2004/0166385 | A1 | 8/2004 | Morse et al. |
| 2004/0166395 | A1 | 8/2004 | Jankowski et al. |
| 2004/0173615 | A1 | 9/2004 | Goodman |
| 2004/0175598 | A1 | 9/2004 | Bliven et al. |
| 2004/0175600 | A1 | 9/2004 | Arthur et al. |
| 2004/0191588 | A1 | 9/2004 | Eshraghi et al. |
| 2004/0209142 | A1 | 10/2004 | Becerra et al. |
| 2004/0211054 | A1 | 10/2004 | Morse et al. |
| 2004/0229101 | A1 | 11/2004 | Davis |
| 2004/0234826 | A1 | 11/2004 | Stuhler |
| 2004/0241521 | A1 | 12/2004 | Finkelshtain et al. |
| 2004/0253500 | A1 | 12/2004 | Bourilkov et al. |
| 2004/0265650 | A1 | 12/2004 | Koo |
| 2004/0265652 | A1 | 12/2004 | Soucy |
| 2005/0008908 | A1 | 1/2005 | Kaye et al. |
| 2005/0008909 | A1 | 1/2005 | Kaye et al. |
| 2005/0011125 | A1 | 1/2005 | Kaye et al. |

| | | | |
|---|---|---|---|
| 2005/0014040 A1 | 1/2005 | Kaye | |
| 2005/0014041 A1 | 1/2005 | Becerra et al. | |
| 2005/0014059 A1 | 1/2005 | Kaye | |
| 2005/0022883 A1 | 2/2005 | Adams et al. | |
| 2005/0023236 A1 | 2/2005 | Adams et al. | |
| 2005/0058873 A1 | 3/2005 | Arthur | |
| 2005/0058879 A1 | 3/2005 | Guay | |
| 2005/0074643 A1 | 4/2005 | Adams et al. | |
| 2005/0074656 A1 | 4/2005 | Koyama et al. | |
| 2005/0095500 A1 | 5/2005 | Corless et al. | |
| 2005/0115637 A1 | 6/2005 | Adams et al. | |
| 2005/0115882 A1 | 6/2005 | Curello et al. | |
| 2005/0116190 A1 | 6/2005 | Adams et al. | |
| 2005/0118468 A1 | 6/2005 | Adams et al. | |
| 2005/0147864 A1* | 7/2005 | Eggum | 429/34 |
| 2005/0155668 A1 | 7/2005 | Finkelshtain et al. | |
| 2006/0008687 A1 | 1/2006 | Kaye et al. | |
| 2006/0014069 A1 | 1/2006 | Kaye et al. | |
| 2006/0014070 A1 | 1/2006 | Kaye et al. | |
| 2006/0021882 A1 | 2/2006 | Kaye et al. | |
| 2006/0024543 A1 | 2/2006 | Kaye et al. | |
| 2006/0024553 A1 | 2/2006 | Kaye et al. | |
| 2006/0024554 A1 | 2/2006 | Kaye et al. | |
| 2006/0070891 A1 | 4/2006 | Kaye | |
| 2006/0071009 A1 | 4/2006 | Kaye | |
| 2006/0073365 A1 | 4/2006 | Kaye | |
| 2007/0077470 A1 | 4/2007 | Adams et al. | |
| 2008/0145739 A1* | 6/2008 | Adams et al. | 429/34 |

FOREIGN PATENT DOCUMENTS

| | | |
|---|---|---|
| JP | 2002-161997 | 6/2002 |
| JP | 2003017102 | 1/2003 |
| JP | 2003-049996 | 2/2003 |
| KR | 2005041265 | 5/2005 |
| WO | WO 00/45457 | 8/2000 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO 03/012902 | 2/2003 |
| WO | WO 2004/030805 | 4/2004 |

OTHER PUBLICATIONS

A.R. Boccaccini et al., "Electrophoretic Deposition of Nanoceramic Particles onto Electrically Conducting Fibre Fabrics", Sep. 21-24, 1998, 43$^{rd}$ International Scientific Colloquium, Technical University of Ilmenau.
J. Bostaph et al., "1W Direct Methanol Fuel Cell System as a Desktop Charger", Oct. 14, 2002, Motorola Labs, Tempe, AZ.
K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.
M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.
S. Ehrenberg et al., "One Piece Bi-Polar (OPB) Plate with Cold Plate Cooling", Dec. 13, 2002, Session PEM R&D II (2A), Dais Analytic—Rogers.
J.D. Holladay et al., "Miniature Fuel Processors for Portable Fuel Cell Power Supplies", Nov. 26, 2002, Battelle Pacific Northwest Division, Richland, WA.
S.W. Janson et al., "MEMS, Microengineering and Aerospace Systems", 1999, The American Institute of Aeronautics and Astronautics, Inc.
J. Kaschmitter et al., "Micro-Fabricated Methanol/Water Reformers for Small PEM Fuel Cell Systems", Jul. 21-24, 2003, 8$^{th}$ Electrochemical Power Sources R&D Symposium, Portsmouth, VA.
K. Keegan et al., "Analysis for a Planar Solid Oxide Fuel Cell Based Automotive Auxiliary Power Unit", Mar. 4-7, 2002, SAE 2002 World Congress, Detroit, MI.
K. Kempa et al., "Photonic Crystals Based on Periodic Arrays of Aligned Carbon Nanotubes", Oct. 3, 2002, Nano Letters 2003, vol. 3. No. 1, 13-18.
R. Kumar et al., "Solid Oxide Fuel Cell Research at Argonne National Laboratory", Mar. 29-30, 2001, 2$^{nd}$ Solid Sate Energy Conversion Alliance Workshop, Arlington, VA.

S.H. Lee et al., "Removal of Carbon Monoxide from Reformate for Polymer Electrolyte Fuel Cell Application", Nov. 16-19, 1998, 1998 Fuel Cell Seminar, Palm Springs, CA.
Q. Li et al., "The CO Poisoning Effect in PEMFCs Operational at Temperatures up to 200° C.", 2003, Journal of the Electrochemical Society, 150 (12) A1599-A1605.
D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.
D.R. Palo et al., "Development of a Soldier-Portable Fuel Cell Power System, Part I: A Bread-Board Methanol Fuel Processor", 2002, Journal of Power Sources 108 (2002) 28-34.
A. Pattekar et al., "A Microreactor for In-situ Hydrogen Production by Catalytic Methanol Reforming", May 27-30, 2001, Proceedings of the 5$^{th}$ International Conference on Microreaction Technology.
A. Pattekar et al., "Novel Microfluidic Interconnectors for High Temperature and Pressure Applications", 2003, Journal of Micromechanics and Microengineering, 13, 337-345.
A.J. Franz et al., "High Temperature Gas Phase Catalytic and Membrane Reactors", Jun. 1999, Massachusetts Institute of Technology, Cambridge, MA.
D. Prater et al., "Systematic Examination of a Direct Methanol-Hydrogen Peroxide Fuel Cell", Sep. 22, 2001, Swift Enterprises, Ltd., Lafayette, IN.
W. Ruettinger et al., "A New Generation of Water Gas Shift Catalysts for Fuel Cell Applications", 2003, Journal of Power Sources, 118, 61-65.
O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.
R.F. Savinell et al., "High Temperature Polymer Electrolyte for PEM Fuel Cells", Sep. 4, 2002, Department of Chemical Engineering, Case Western Reserve University.
R. Srinivasan et al., "Micromachined Reactors for Catalytic Partial Oxidation Reactions", Nov. 1997, AIChe Journal, vol. 43, No. 11, 3059-3069.
S. Swartz et al., "Ceria-Based Water-Gas-Shift Catalysts", Aug. 1, 2003, NexTech Materials, Ltd., Wolrthington, OH.
S. Tasic et al., "Multilayer Ceramic Processing of Microreactor Systems", Oct. 14, 2002, Motorola Labs, Tempe, AZ.
V. Tomašić et al., "Development of the Structured Catalysts for the Exhaust Gas Treatment", 2001, Chem. Biochem. Eng. Q. 15 (3), 109-115.
Tiax LLC, "Advanced Hydrogen Storage: A System's Perspective and Some Thoughts on Fundamentals", Aug. 14-15, 2002, Presentation for DOE Workshop on Hydrogen Storage, Cambridge, MA.
Wan et al., "Catalyst Preparation: Catalytic Converter", Feb. 19, 2003, www.insightcentral.net/encatalytic.html.
J. Zalc et al., "Are Noble Metal-Based Water-Gas Shift Catalysts Practical for Automotive Fuel Processing?", 2002, Journal of Catalysis, 206, 169-171.
J. Zizelman et al., "Solid-Oxide Fuel Cell Auxiliary Power Unit: A Paradigm Shift in Electric Supply for Transportation", undated, Delphi Automotive Systems.
"Methanol-Powered Laptops—Cleared for Take-Off", www.silicon.com, Oct. 7, 2002.
Melissa Funk, "Methanol Fuel Quality Specification Study for Proton Exchange Membrane Fuel Cells, Final Report", XCELLSIS, Feb. 2002, 65 pages.
Dr. Detlef zur Megede et al., "MFCA Research Document, Complete", Methanol Fuel Cell Alliance, Sep. 2000, 242 pages.
International Search Report, related to U.S. Appl. No. 10/877,766, dated Mar. 28, 2005.
Written Opinion from PCT application No. PCT/US05/46816 dated May 18, 2006.
Office Action dated Jan. 7, 2008 in U.S. Appl. No. 11/228,693.
Office Action dated Mar. 8, 2005 in U.S. Appl. No. 10/877,766.
Office Action dated Aug. 11, 2005 in U.S. Appl. No. 10/877,766.
Office Action dated Mar. 8, 2006 in U.S. Appl. No. 10/877,766.
Office Action dated Aug. 24, 2006 in U.S. Appl. No. 10/877,766.
Office Action dated Feb. 27, 2007 in U.S. Appl. No. 10/877,766.
Office Action dated Jun. 14, 2007 in U.S. Appl. No. 10/877,766.

T.M. Floyd et al., "Liquid-Phase and Multi-Phase Microreactors for Chemical Synthesis", Jun. 1999, Massachusetts Institute of Technology, Cambridge, MA.
Office Action dated Aug. 29, 2006 in U.S. Appl. No. 11/229,049.
Office Action dated Dec. 4, 2006 in U.S. Appl. No. 11/229,049.
International Search Report from corresponding PCT application No. PCT/US05/46816 dated May 18, 2006.
Office Action dated Dec. 18, 2009 in U.S. Appl. No. 11/316,199.
Notice of Allowance dated Oct. 23, 2009 in U.S. Appl. No. 11/416,785.
Office Action dated Oct. 19, 2009 in U.S. Appl. No. 11/228,906.
Notice of Allowance dated Sep. 28, 2009 in U.S. Appl. No. 11/229,045.
Office Action dated Sep. 24, 2009 in U.S. Appl. No. 11/229,092.
Office Action dated Sep. 23, 2009 in U.S. Appl. No. 11/229,094.
Office Action dated Jun. 18, 2009 in U.S. Appl. No. 11/228,955.
Office Action dated Aug. 14, 2009 in U.S. Appl. No. 11/416,785.
Office Action dated Apr. 8, 2009 in U.S. Appl. No. 11/416,785.
Office Action dated Apr. 14, 2009 in U.S. Appl. No. 11/228,764.
Office Action dated Mar. 5, 2009 in U.S. Appl. No. 11/228,794.
Office Action dated Feb. 26, 2009 in U.S. Appl. No. 11/229,051.
Office Action dated Jan. 30, 2009 in U.S. Appl. No. 10/877,766.
Office Action dated Apr. 14, 2009 in U.S. Appl. No. 11/229,094.
Office Action dated Apr. 16, 2009 in U.S. Appl. No. 11/229,092.
Office Action dated Apr. 2, 2009 in U.S. Appl. No. 11/228,906.
Office Action dated Nov. 20, 2009 in U.S. Appl. No. 11/830,662.
Fuel Cell Handbook, Oct. 2000, US Department of Energy, Fifth Edition, pp. 1-1 to 1-8.
Office Action dated Nov. 26, 2008 in U.S. Appl. No. 11/416,785.
Office Action dated May 30, 2008 in U.S. Appl. No. 11/416,785.
Fuel Cell Handbook, Fifth Edition, by EG&G Services, Parsons, Inc and Science Applications International Corporation, Oct. 2000.
Office Action dated Oct. 7, 2008 from U.S. Appl. No. 11/228,906.
Office Action dated Feb. 5, 2008 in U.S. Appl. No. 10/877,766.
Office Action dated Jul. 30, 2008 in U.S. Appl. No. 10/877,766.
International Search Report dated Apr. 8, 2008 in PCT Application No. PCT/US05/46578.
Written Opinion dated Apr. 8, 2008 in PCT Application No. PCT/US05/46578.
International Search Report dated Apr. 9, 2008 in PCT Application No. PCT/US06/16876.
Written Opinion dated Apr. 9, 2008 in PCT Application No. PCT/US06/16876.
Chinese Office Action dated Aug. 29, 2008 from CN Patent Application No. 2004800246307.
Office Action dated Mar. 2, 2010 in U.S. Appl. No. 11/830,662.
Office Action dated Jan. 27, 2010 in U.S. Appl. No. 11/830,672.
Office Action dated Jul. 20, 2010 in U.S. Appl. No. 11/316,199.

* cited by examiner

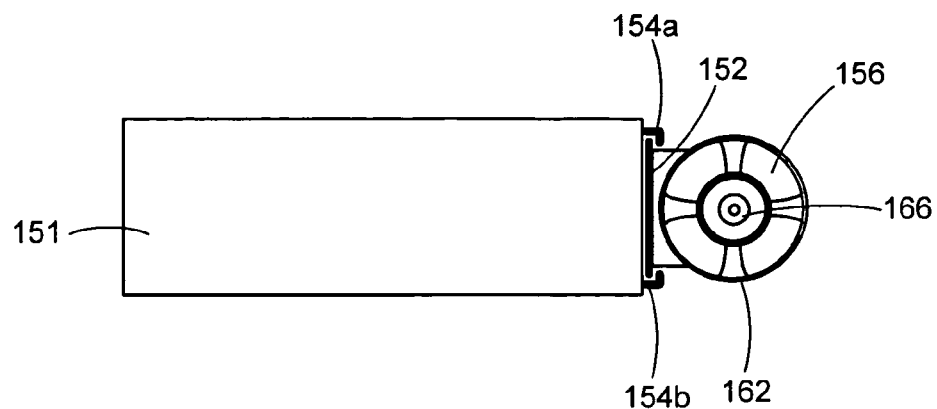
FIG. 4A
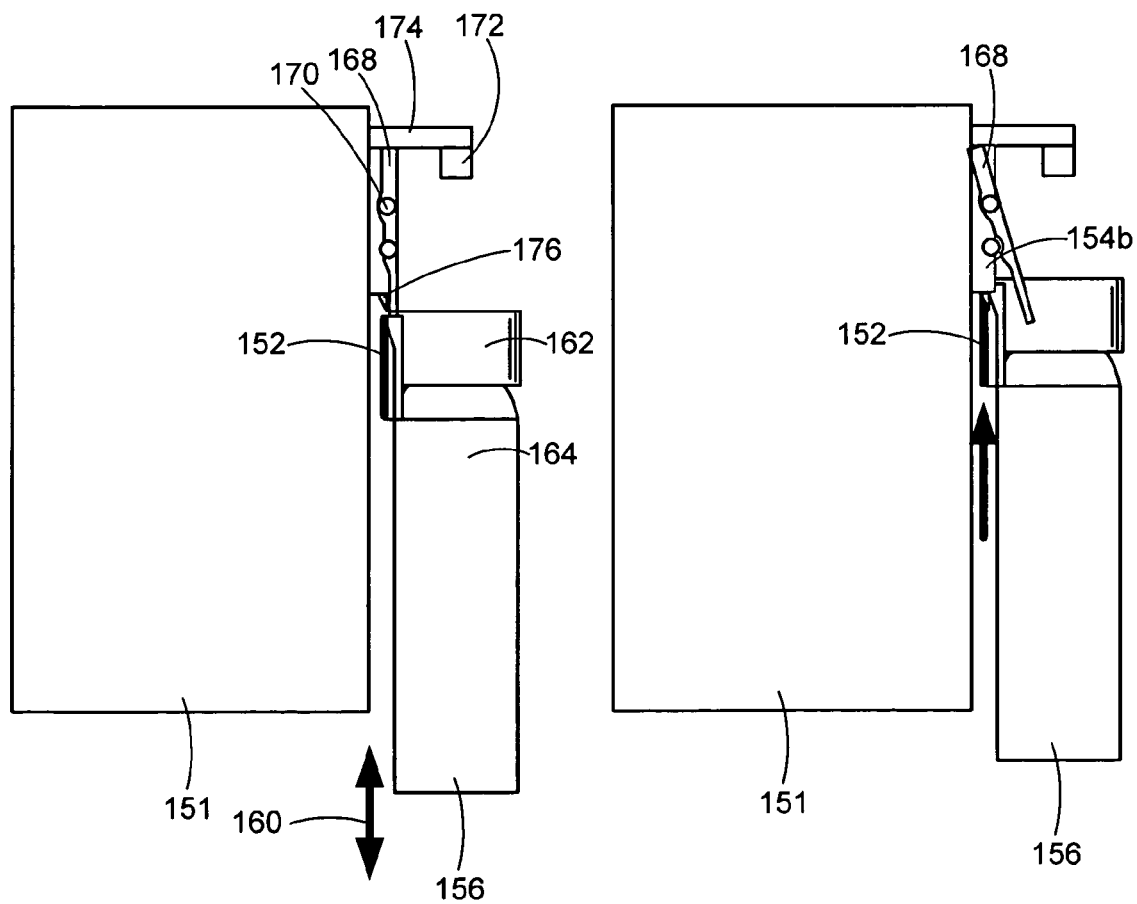
FIG. 4B  FIG. 4C

FIG. 4D  FIG. 4E

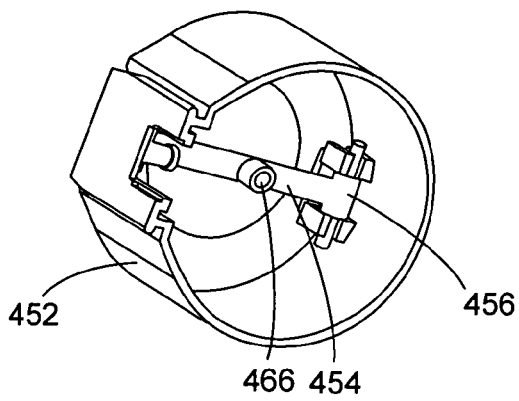
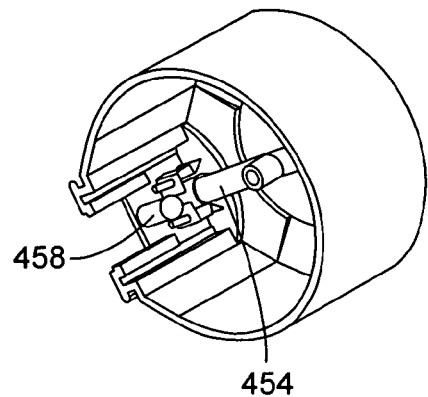
FIG. 8A  FIG. 8B
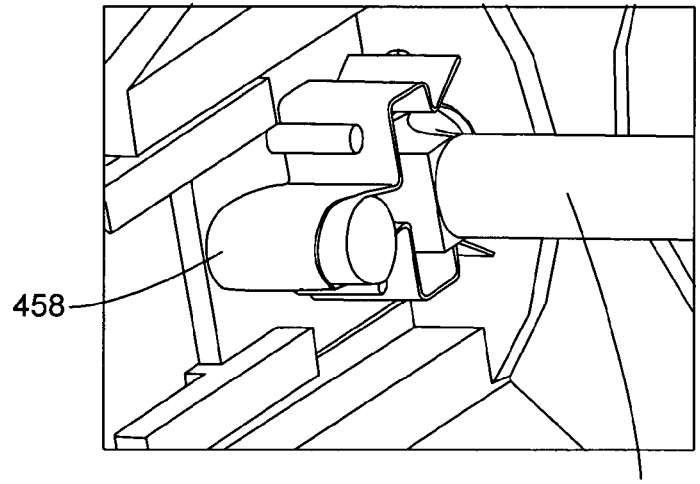
FIG. 8C
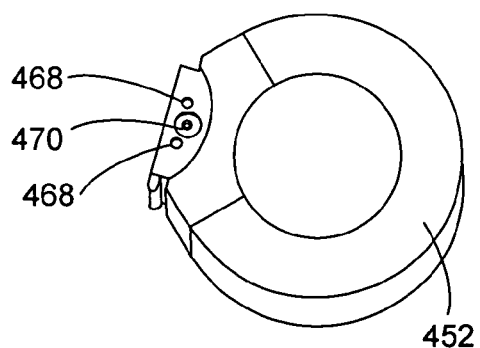
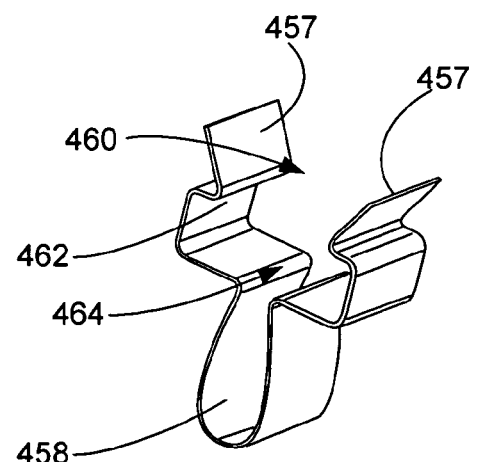
FIG. 8D  FIG. 8E

FUEL CARTRIDGE CONNECTIVITY

CROSS-REFERENCE TO RELATED APPLICATIONS

This application a) claims priority under 35 U.S.C. §119(e) to: i) U.S. Provisional Patent Application No. 60/638,421 filed on Dec. 21, 2004 entitled "Micro Fuel Cell Architecture", ii) U.S. Provisional Patent Application No. 60/649,638 filed on Feb. 2, 2005 entitled "Heat Efficient Micro Fuel Cell System", iii) U.S. Provisional Patent Application No. 60/677,424 filed on May 2, 2005 entitled "Micro Fuel Cell Fuel Cartridge Apparatus", and iv) U.S. Provisional Patent Application No. 60/682,598 filed on May 18, 2005 entitled "Fuel Storage Devices for Use with Micro Fuel Cells"; and b) claims priority under 35 U.S.C. §120 to commonly owned and U.S. patent application Ser. No. 10/877,766, filed Jun. 25, 2004 and entitled "PORTABLE FUEL CARTRIDGE FOR FUEL CELLS", which claimed priority under 35 U.S.C. §119(e) from i) U.S. Provisional Patent Application No. 60/482,996 filed on Jun. 27, 2003, ii) U.S. Provisional Patent Application No. 60/483,416 and filed on Jun. 27, 2003, and iii) U.S. Provisional Patent Application No. 60/483,415 and filed on Jun. 27, 2003; each of these patent applications provided above is incorporated by reference for all purposes.

BACKGROUND OF THE INVENTION

The present invention relates to fuel cell technology. In particular, the invention relates to portable fuel cartridges and storage devices that store a fuel, allow transportation of the fuel, and permit detachable connectivity to electronics devices or fuel cell packages.

A fuel cell electrochemically combines hydrogen and oxygen to produce electricity. The ambient air readily supplies oxygen; hydrogen provision, however, calls for a working supply. The hydrogen supply may include a direct hydrogen supply or a 'reformed' hydrogen supply. A direct hydrogen supply outputs hydrogen, such as compressed hydrogen in a pressurized container or a solid-hydrogen storage system.

A reformed hydrogen supply processes a fuel (or fuel source) to produce hydrogen. The fuel acts as a hydrogen carrier, is manipulated to separate hydrogen, and may include a hydrocarbon fuel, hydrogen bearing fuel stream, or any other hydrogen bearing fuel such as ammonia. Currently available hydrocarbon fuels include methanol, ethanol, gasoline, propane and natural gas. Liquid fuels offer high energy densities and the ability to be readily stored and transported.

Consumer electronics devices and other portable electrical power applications currently rely on lithium ion and other battery technologies. Portable fuel cell systems that generate electrical energy for portable applications such as electronics devices would be desirable, but are not yet commercially available. Portable fuel cartridges that transport the fuel are also needed before commercial viability of portable fuel cell systems becomes widespread.

SUMMARY OF THE INVENTION

The present invention relates to a portable cartridge that stores a fuel for use with a fuel cell system. The cartridge includes a housing that provides mechanical protection for internal components. The cartridge also includes a connector such as a contact valve that interfaces with a mating connector to permit transfer of the fuel source between the cartridge and a device that includes the mating connector. The device may be a portable electronics device such as a laptop computer or portable fuel cell system.

Cartridges described herein improve mechanical interface between a cartridge and a device that couples to the cartridge. The interface may include one or more of: a sliding interface between a cartridge and device, a latching interface that holds the cartridge in one or more positions relative to the device, and/or keyed access and security features that prevent unintended access to the fuel, for example. Multiple valves may also be included with a cartridge.

In one embodiment, a cartridge includes a locking and latching interface that improves mechanical interconnection between a fuel cartridge and device that includes a fuel cell system. The locking and latching interface permits multiple mechanical coupling positions between the cartridge and device. One position permits mechanical coupling and fluid communication between the two. A detent position provides mechanical coupling between the cartridge and fuel cell device but denies fuel source transfer between the two.

In one aspect, the invention relates to a portable cartridge for storing a fuel used in a fuel cell system. The portable cartridge includes a bladder that is adapted to contain the fuel and to conform to the volume of the fuel in the bladder. The portable cartridge also includes a housing that provides mechanical protection for the bladder. The portable cartridge further includes a connector configured to interface with a mating connector to permit transfer of the fuel between the bladder and a device that includes the mating connector. The portable cartridge additionally includes a sliding interface configured to cooperate with a mating sliding interface on the device. The sliding interface and mating sliding interface cooperate to provide detachable mechanical coupling between the portable cartridge and the device, which when the portable cartridge and the device are coupled together using the sliding interface and mating sliding interface, provides relative motion between the portable cartridge and the device.

In another aspect, the invention relates to a cartridge for storing a fuel. The cartridge includes a housing, a connector and a cartridge latching interface. The cartridge latching interface is configured to cooperate with a mating latching interface on a device to hold the cartridge in multiple positions relative to the device. The multiple positions include a first position that permits fluidic communication between the cartridge and the device, and a second position that does not permit fluidic communication between the cartridge and the device.

In yet another aspect, the invention relates to a fuel cell system for producing electrical energy. The fuel cell system includes a device that includes a fuel cell, a device latching interface and a mating connector. The system also includes a cartridge. The cartridge includes a housing, a connector and a cartridge latching interface configured to cooperate with the device latching interface so as to hold the cartridge in multiple positions relative to the device. The multiple positions include a first position that permits fluidic communication between the cartridge and the device, and a second position that does not permit fluidic communication between the cartridge and the device. The system further includes an actuator adapted to decouple the cartridge latching interface from the device latching interface; and a controller configured to send an instruction to the actuator to decouple the cartridge latching interface from the mating latching interface when the fuel cell is off.

In still another aspect, the invention relates to a cartridge for storing a fuel used in a fuel cell system. The cartridge includes a bladder, a cartridge connector, and a housing. The housing provides mechanical protection for the bladder, and prevents access to the cartridge connector without a key, included with a mating connector or a device that includes the mating connector, that permits access to the cartridge connector when the cartridge is connected to the device.

In another aspect, the invention relates to a cartridge for storing a fuel. The cartridge includes a first contact valve configured to permit fluidic communication between the cartridge and the device when the first contact valve is at least partially depressed. The cartridge also includes a second contact valve on the device and configured to permit fluidic communication between the cartridge and the device when the second contact valve is at least partially depressed.

In yet another aspect, the invention relates to a fuel cell system for producing electrical energy. The system includes a cartridge and a device that includes a fuel cell. The cartridge includes a bladder, a cartridge connector, and a housing that provides mechanical protection for the bladder and includes a cavity between the bladder and housing that at least partially contains the bladder. The system also includes an air source that pressurizes air; and at least one valve that controls air flow provided by the air source to a) the fuel cell, and b) the cavity in the cartridge.

These and other features of the present invention will be described in the following description of the invention and associated figures.

BRIEF DESCRIPTION OF THE DRAWINGS

FIGS. 4A-4F illustrate a sliding interface that permits multiple positions between a cartridge and device in accordance with one embodiment of the present invention.

FIGS. 8A-8E illustrate a second pin-based key access that manipulates an internal mechanism in accordance with another specific embodiment of the present invention.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Fuel Cell Systems

Cartridges described herein are suitable for use with a wide array of fuel cell systems. A micro fuel cell system generates dc voltage, and may be used in numerous portable applications. For example, electrical energy generated by a micro fuel cell may power a notebook computer or a portable electrical generator carried by military personnel. In one embodiment, the present invention provides 'small' fuel cells that are configured to output less than 200 watts of power (net or total). Fuel cells of this size are also referred to as 'micro fuel cells'. In one embodiment, the fuel cell is configured to controllably generate and output from about 1 milliwatt to about 200 Watts. In another embodiment, the fuel cell generates from about 5 Watts to about 60 Watts. One specific portable fuel cell package produces about 20 Watts or about 45 Watts, depending on the number of cells in the stack.

Cartridges of the present invention are also suitable for use with a variety of fuel cell systems types. Suitable system architectures include direct methanol fuel cell (DMFC) systems, reformed methanol fuel cell (RMFC) systems, solid oxide fuel cell (SOFC) systems, sodium borohydride fuel cell systems, formic acid fuel cells and reformed diesel PEM stack systems etc. All these fuel cell system types rely on a cartridge for fuel storage and transportation.

Figure 1:
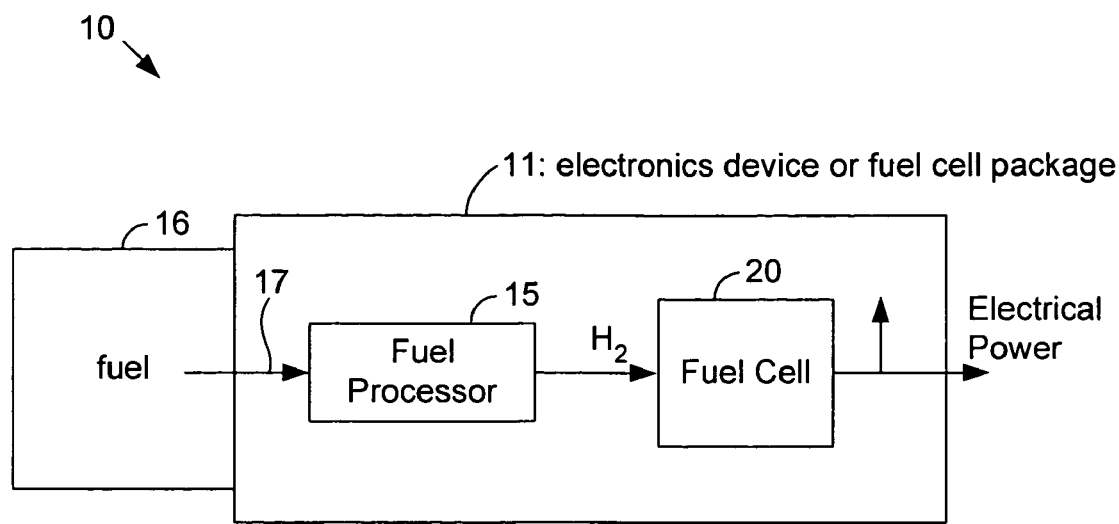
FIG. 1 illustrates an exemplary RMFC fuel cell system for producing electrical energy in accordance with one embodiment of the present invention.

FIG. 1 illustrates an RMFC fuel cell system 10 for producing electrical energy in accordance with one embodiment of the present invention. System 10 comprises storage device 16, fuel processor 15 and fuel cell 20. Fuel processor 15 processes a fuel 17 to produce hydrogen for supply to fuel cell 20. Fuel cell system 10 may be a stand-alone system, which is a single package 11 that produces power as long as it has access to a) oxygen and b) hydrogen or a hydrogen source such as fuel 17.

Cartridge 16, which is also interchangeably referred to as a 'storage device', stores a fuel 17. Cartridge 16 may comprise a refillable and/or disposable fuel cartridge; either design permits recharging capability for system 10 or an electronics device 11 by swapping a depleted cartridge 16 for one with fuel. A connector on cartridge 16 interfaces with a mating connector on electronics device 11 to permit fuel to be withdrawn from cartridge 16. In one embodiment, cartridge connector includes a contact valve that interfaces with mating plumbing on the device 11.

In one embodiment, cartridge 16 includes a bladder that contains the fuel and conforms to the volume of fuel in the bladder. An outer rigid housing or housing assembly provides mechanical protection for the bladder. The bladder and housing permit a wide range of portable and non-portable cartridge sizes with fuel capacities ranging from a few milliliters to several liters. In another embodiment, the cartridge is vented and includes a small hole, single direction flow valve, hydrophobic filter, or other aperture to allow air to enter the fuel cartridge as fuel 17 is consumed and displaced from the cartridge. This type of cartridge allows for "orientation" independent operation since pressure in the bladder remains relatively constant as fuel is displaced.

A pressure source moves the fuel 17 from cartridge 16 to fuel processor 15. In one embodiment, a pump draws and controls fuel 17 flow from cartridge 16 such as a diaphragm pump. Cartridge 16 may also be pressurized with a pressure source such as foam or a propellant internal to the housing that pushes on the bladder (e.g, propane, compressed nitrogen gas or compressed oxygen from the system 10). In this case, system 10 then employs a control valve to regulate flow, etc. If system 10 is load following, then a control system meters fuel 17 flow to deliver fuel to processor 15 at a flow rate determined by a required power level output of fuel cell 20 and regulates a controlled item (e.g., the pump or valve) accordingly. Other pressure sources may be used to move fuel 17 from cartridge 16. For example, some cartridge designs suitable for use herein include a wick that moves a liquid fuel from locations within a fuel cartridge to a cartridge exit.

In another embodiment, the cartridge includes 'smarts', or a digital memory used to store information related to usage of the fuel cartridge.

Fuel 17 acts as a carrier for hydrogen and can be processed or manipulated to separate hydrogen. As the terms are used herein, 'fuel', 'fuel source' and 'hydrogen fuel source' are interchangeable and all refer to any fluid (liquid or gas) that can be manipulated to separate hydrogen. Fuel 17 may include any hydrogen bearing fuel stream, hydrocarbon fuel or other source of hydrogen such as ammonia. Currently available hydrocarbon fuels 17 suitable for use with the present invention include gasoline, $C_1$ to $C_4$ hydrocarbons, their oxygenated analogues and/or their combinations, for example. Other fuel sources may be used with a fuel cell package of the present invention, such as sodium borohydride. Several hydrocarbon and ammonia products may also be used. Liquid fuels 17 offer high energy densities and the ability to be readily stored and shipped.

Fuel 17 may be stored as a fuel mixture. When the fuel processor 15 comprises a steam reformer, for example, storage device 16 includes a fuel mixture of a hydrocarbon fuel and water. Hydrocarbon fuel/water mixtures are frequently represented as a percentage of fuel in water. In one embodiment, fuel 17 comprises methanol or ethanol concentrations in water in the range of 1-99.9%. Other liquid fuels such as butane, propane, gasoline, military grade "JP8", etc. may also be contained in storage device 16 with concentrations in water from 5-100%. In a specific embodiment, fuel 17 comprises 67% methanol by volume.

Cartridge 16 mechanically and detachably couples to device 11, which includes fuel processor 15 and fuel cell 20. In one embodiment, device 11 is a portable package that includes a fuel cell system and one or more DC outputs. Such a portable package operates as an independent and portable power source that provides electrical energy as long as the package has access to fuel 17. Military personnel, who carry an array of electronics devices and perform extended operations, benefit from such a portable and replenishable power supply. In another embodiment, device 11 includes an electronics device that consumes electrical energy generated by fuel cell 20. Examples include laptop computers, handheld computers and PDAs, cell phones, lights such as flashlights, radios, etc. The device 11 may export the energy to another electronics device, use it internally, and combinations thereof. Fuel cells described herein are useful to power a wide array of electronics devices, and in general, the present invention is not limited by what device couples to cartridge 16 or receives fuel from cartridge 16.

Fuel processor 15 processes fuel 17 and outputs hydrogen. In one embodiment, a hydrocarbon fuel processor 15 heats and processes a hydrocarbon fuel 17 in the presence of a catalyst to produce hydrogen. Fuel processor 15 comprises a reformer, which is a catalytic device that converts a liquid or gaseous hydrocarbon fuel 17 into hydrogen and carbon dioxide. As the term is used herein, reforming refers to the process of producing hydrogen from a fuel 17. Fuel processor 15 may output either pure hydrogen or a hydrogen bearing gas stream (also commonly referred to as 'reformate').

Various types of reformers are suitable for use in fuel cell system 10; these include steam reformers, auto thermal reformers (ATR) and catalytic partial oxidizers (CPOX) for example. A steam reformer only needs steam and fuel to produce hydrogen. ATR and CPOX reformers mix air with a fuel/steam mixture. ATR and CPOX systems reform fuels such as methanol, diesel, regular unleaded gasoline and other hydrocarbons. In a specific embodiment, storage device 16 provides methanol 17 to fuel processor 15, which reforms the methanol at about 280° C. or less and allows fuel cell system 10 usage in low temperature applications.

Fuel cell 20 electrochemically converts hydrogen and oxygen to water, generating electrical energy (and sometimes heat) in the process. Ambient air readily supplies oxygen. A pure or direct oxygen source may also be used. The water often forms as a vapor, depending on the temperature of fuel cell 20. For some fuel cells, the electrochemical reaction may also produce carbon dioxide as a byproduct.

In one embodiment, fuel cell 20 is a low volume ion conductive membrane (PEM) fuel cell suitable for use with portable applications such as consumer electronics. A PEM fuel cell comprises a membrane electrode assembly (MEA) that carries out the electrical energy generating an electrochemical reaction. The MEA includes a hydrogen catalyst, an oxygen catalyst, and an ion conductive membrane that a) selectively conducts protons and b) electrically isolates the hydrogen catalyst from the oxygen catalyst. A hydrogen gas distribution layer may also be included; it contains the hydrogen catalyst and allows the diffusion of hydrogen therethrough. An oxygen gas distribution layer contains the oxygen catalyst and allows the diffusion of oxygen and hydrogen protons therethrough. Typically, the ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, a PEM fuel cell includes a fuel cell stack having a set of bi-polar plates. In one embodiment, each bi-polar plate is formed from a single sheet of metal that includes channel fields on opposite surfaces of the metal sheet. Thickness for these plates is typically below about 5 millimeters, and compact fuel cells for portable applications may employ plates thinner than about 2 millimeters. The single bi-polar plate thus dually distributes hydrogen and oxygen: one channel field distributes hydrogen while a channel field on the opposite surface distributes oxygen. In another embodiment, each bi-polar plate is formed from multiple layers that include more than one sheet of metal.

Multiple bi-polar plates can be stacked to produce the 'fuel cell stack' in which a membrane electrode assembly is disposed between each pair of adjacent bi-polar plates. Gaseous hydrogen distribution to the hydrogen gas distribution layer in the MEA occurs via a channel field on one plate while oxygen distribution to the oxygen gas distribution layer in the MES occurs via a channel field on a second plate on the other surface of the membrane electrode assembly.

In electrical terms, the anode includes the hydrogen gas distribution layer, hydrogen catalyst and a bi-polar plate. The anode acts as the negative electrode for fuel cell 20 and conducts electrons that are freed from hydrogen molecules so that they can be used externally, e.g., to power an external circuit or stored in a battery. In electrical terms, the cathode includes the oxygen gas distribution layer, oxygen catalyst and an adjacent bi-polar plate. The cathode represents the positive electrode for fuel cell 20 and conducts the electrons back from the external electrical circuit to the oxygen catalyst, where they can recombine with hydrogen ions and oxygen to form water.

In a fuel cell stack, the assembled bi-polar plates are connected in series to add electrical potential gained in each layer of the stack. The term 'bi-polar' refers electrically to a bi-polar plate (whether mechanically comprised of one plate or two plates) sandwiched between two membrane electrode assembly layers. In a stack where plates are connected in series, a bi-polar plate acts as both a negative terminal for one adjacent (e.g., above) membrane electrode assembly and a positive terminal for a second adjacent (e.g., below) membrane electrode assembly arranged on the opposite surface of the bi-polar plate.

In a PEM fuel cell, the hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder thinly coated onto a carbon paper or cloth. Many designs employ a rough and porous catalyst to increase surface area of the platinum exposed to the hydrogen and oxygen.

Since the electrical generation process in fuel cell 20 is exothermic, fuel cell 20 may implement a thermal management system to dissipate heat. Fuel cell 20 may also employ a number of humidification plates (HP) to manage moisture levels in the fuel cell.

While the present invention has primarily been discussed so far with respect to PEM fuel cells, it is understood that the present invention may be practiced with other fuel cell architectures. The main difference between fuel cell architectures is the type of ion conductive membrane used. In another embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may be applicable to the fuel processors described herein that output hydrogen for a fuel cell. Other such fuel cell architectures include alkaline and molten carbonate fuel cells, for example.

Figure 2A:
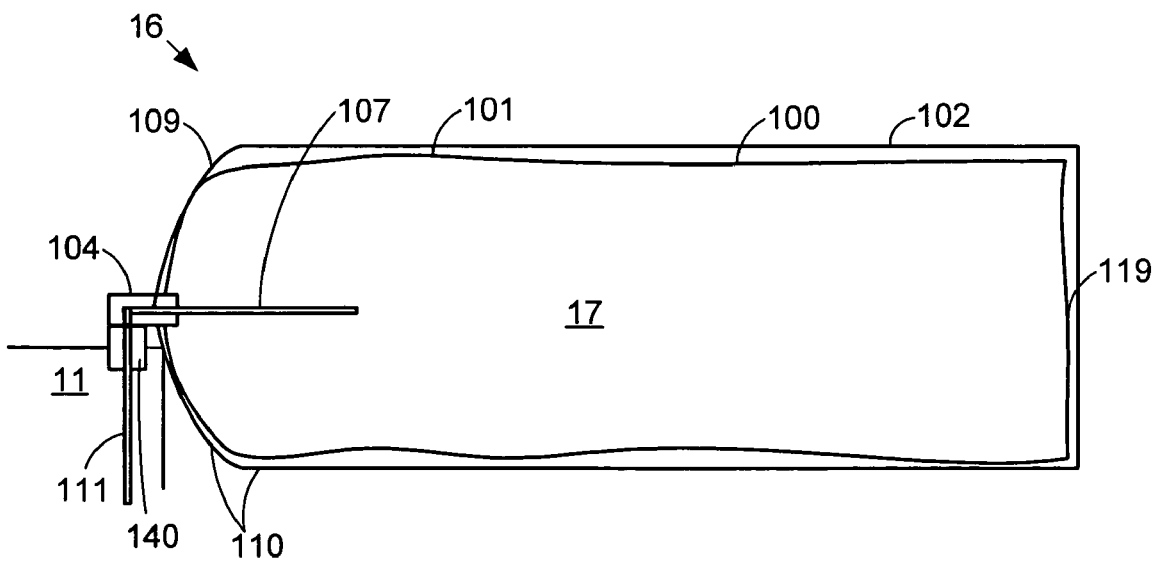
FIG. 2A shows a simplified cross section of a cartridge in accordance with one embodiment of the present invention.

Having briefly discussed fuel cell systems fueled by a cartridge, cartridges of the present invention will now be discussed in more detail. FIG. 2A shows a simplified cross section of a cartridge 16 in accordance with one embodiment of the present invention. Cartridge 16 includes a bladder 100, housing 102 and connector 104.

Bladder 100 contains fuel 17 and conforms to the volume of fuel in the bladder. In one embodiment, bladder 100 comprises a compliant structure that mechanically assumes a volume according to a volume of liquid stored therein. Compliant walls 101 of bladder 100, which expand and/or open when fluid is added to bladder 100, form the volume and contract and/or collapse when fluid is removed according to the negative pressure developed upon fluid removal. In one embodiment, bladder 100 includes a sac that changes size and shape with the volume of liquid contained therein. Plastic, rubber, latex or a metal such as nickel are suitable materials for use as the walls 101 of bladder 100. In this case, the walls are compliant and change size with a changing liquid volume, and in some cases the walls allow for stretching with high fluid pressures in bladder 100. Walls 101 may also comprise a fire retardant plastic material. One suitable fire retardant plastic material for walls 101 is NFPA-701-99 Test 1 Polyethelyne as provided by Plasticare of Orange Park, Fla. In another embodiment, bladder 100 comprises a fixed cylinder and a piston that is pushed by a spring and moves in the cylinder to pressurize the bladder and displace volume according to used fuel.

A maximum volume 119 characterizes bladder 100 when the bladder fully expands. Maximum bladder volumes may vary with an application. In a specific embodiment, maximum volumes for cartridge 16 range from about 20 milliliters to about 4 liters. Maximum volumes from about 20 milliliters to about 800 milliliters are suitable for many portable electronics applications. A maximum volume for bladder 100 of about 200 to about 500 milliliters is suitable for laptop computer usage and many portable applications. Some extended run time systems may rely on storage devices 16 having up to 80 liters of maximum volume. The maximum volume for bladder 100 may differ from the fuel capacity of cartridge 16. In some designs, cartridge 16 includes multiple bladders 100 that each contributes a maximum volume and cumulatively adds to a total fuel capacity for cartridge 16. For example, a spare cartridge 16 intended for electronics power back-up may contain two bladders 100 that each include 300 milliliters of fuel 17.

While the present invention will now primarily refer to the storage of methanol in bladder 100 and cartridge 16, it is understood that bladder 100 and cartridge 16 may contain other fuels such as those listed above. In addition, bladder 100 may contain a fuel mixture.

Housing 102 provides mechanical protection for bladder 100 and any other components of storage device 16 included within housing 102. Housing 102 comprises a set of rigid walls 110 that contain bladder 100 and other internal components of cartridge 16. In one embodiment, all components of cartridge 16 are contained within housing 102 save any portions of connector 104 that protrude out of the housing for interface with mating connector 140. In another embodiment, connector 104 is recessed within housing 102 and housing 102 provides an outer shell or assembly housing that defines outer bounds and shape of storage device 16. Walls 110 collectively form an outer case or shell that mechanically separates components internal to housing 102 from the external environment. Walls 110 also collectively form an interior cavity 112. Interior cavity 112 is a space within storage device that contains bladder 100. As described below, interior cavity 112 may comprises multiple compartments, each of which include a separate bladder 100.

Various embodiments provided below show additional walls used in housing 102. Housing 102 is referred to herein as a 'housing assembly' when one or more rigid walls or parts are added to cartridge 16 and provide additional functionality other than just containment of internal components. Such functionality may include connectivity with a package (e.g., the sliding interface described below), filtration of air going into a fuel cell system package, and holding one or more components of the cartridge such as a chip.

Rigid walls 110 may comprise a suitably stiff material such as a plastic, metal (e.g., aluminum), polycarbonate, polypropelene, carbon fiber matrix, carbon composite material, etc. Rigid walls 110 may also be formed from a fire retardant material such as a fire retardant plastic material. One suitable fire retardant plastic material for walls 110 is 8-12% weight, JLS-MC mixed with PA66 Polyamide as provided by JLS Chemical of Pomona, Calif. Rigid walls 110 may be designed according to criteria for construction of thin walled pressure vessels. In this case, walls 110 and housing 102 may be designed to withstand a maximum pressure within bladder 100.

Housing 102 may be variably shaped as desired by an application and the present invention is not limited to any particular shape. In one embodiment, housing 102 includes an elliptical (including circular) cross section, a rectangular cross section with chamfered corners, or other substantially consistent profile or shape in a given direction. For the embodiment shown, housing 102 includes a) a top cap 111 that holds connector 104 and b) a substantially consistent cross section in a direction that extends away from a top cap 111 in connector 104. In one embodiment, housing 102 comprises a transparent section or clear window to allow for visual fuel gauging.

In one embodiment, housing 102 is integrally formed or manufactured to prevent disassembly of housing 102. In this case, walls 110 may be permanently attached (e.g., bonded and/or extruded from a common material) such that access into housing 102 is only gained through destruction of walls 110 and housing 102.

Connector 104 interfaces with a mating connector 140 included in device 11. Together, connector 104 and mating connector 140 permit transfer of fuel source 17 between bladder 100 and the external device 11. When mating connector 140 is included in a device that includes fuel processor 15 (see FIG. 1), connector 104 and mating connector 140 interface to permit transfer of fuel 17 from cartridge 16 to fuel processor 15, and through any intermediate plumbing between the two. Alternatively, when mating connector 140 is included in a hydrogen fuel source refiller, connector 104 and mating connector 140 interface to permit transfer of fuel 17 from the refiner to cartridge 16. Interface between connector 104 and mating connector 140 may comprise any relationship and mating structures that permit fluid communication between the two connectors. Several contact valves and configurations are provided below.

When mating connector 140 and connector 104 are mechanically coupled, a pump in device 11 and run by fuel cell system 10 draws fluid from bladder 100 into device 11. More specifically, fuel source 17 travels from bladder 100, through tube 107 and connector 104, into and through mating connector 140, and through tube 111 in device 11 to a fuel processor 15 included therein.

Cartridge 16 and device 11, and or connector 104 and mating connector 140, may also include mechanical coupling to secure the interface, such as sliding interfaces and latching elements that bind connector 104 and mating connector 140 together until physically released. Several suitable example are also described below.

In one embodiment, connector 104 and mating connector 140 each comprise a geometry that at least partially matches geometry of the other. Exemplary connector 104 and mating connector 140 geometries are also described below.

In one embodiment, connector 104 incorporates a quick disconnect that permits cartridge 16 to be readily removed by pulling on housing 102 (or the assembly housing). This separates connector 104 and mating connector 140 and separates any electrical links and detaches plumbing responsible for fluid communication between cartridge 16 and device 11. A second cartridge 16 with a quick disconnect connector 104 may then be readily inserted back into mating connector 140. The quick disconnect allows rapid replacement of cartridge 16 with another cartridge 16 when fuel source volume levels are low. The quick disconnect connector 104 may also include additional ports according to the plumbing needs of cartridge 16 (e.g., a scrubbing bed or oxygen pressurization). A quick connect/disconnect connector 104 may also include other features to control attachment and detachment requirements such as two-handed operation or a high force actuator. Commercially available quick disconnect connectors are available from a variety of vendors. One suitable quick disconnect connector is model number QDC101 as provided by Beswick of Greenland, N.H.

Connector 104 and mating connector 140 may provide a contact shutoff capability when cartridge 16 is removed. In this case, each only opens when connected to the other and when cartridge 16 interfaces with device 11. In one embodiment, cartridge 16 or device 11 includes a small sponge or swab located on or near connector 104 to collect any fuel leakage during device connection or disconnection.

In one embodiment, one of connector 104 and mating connector 140 includes a 'male' designation and configuration while the other includes a 'female' designation and configuration. The male configuration includes portions of the connector that protrude, such as a valve, one or more pins or electrical leads. The female configuration includes portions of the connector that receive the male portions, such as receptacles that receive a contact valve, or holes arranged to receive the male electrical leads and permit electrical communication. The connector 104 on cartridge 16 may include a female configuration that recesses within housing 102. In this case, since it is recessed, connector 104 cannot be knocked off during rough handling.

Mating connector 140 may be disposed on a variety of devices. In one embodiment, mating connector 140 is disposed on a side portion of an OEM device (i.e. a laptop computer). In another embodiment, mating connector 140 is included in a portable fuel cell package. Further discussion of fuel cell packages suitable for use with the present invention are described in commonly owned patent application entitled "Compact Fuel Cell Package" and filed on May 2, 2005; this application is incorporated by reference in its entirety for all purposes. Mating connector 140 may also be included in refilling hardware that refills cartridge 16 with fuel source 17.

In another embodiment, mating connector 140 includes a contact valve, which when depressed, permits fuel flow between the device and cartridge. Embodiments described below include dual contact valve designs in which both contact valves must be depressed before fuel flows. The dual contact valve designs may include: a first contact valve on the cartridge and a second on the device, both valves on the cartridge, or both valves on the device.

Figure 2B:
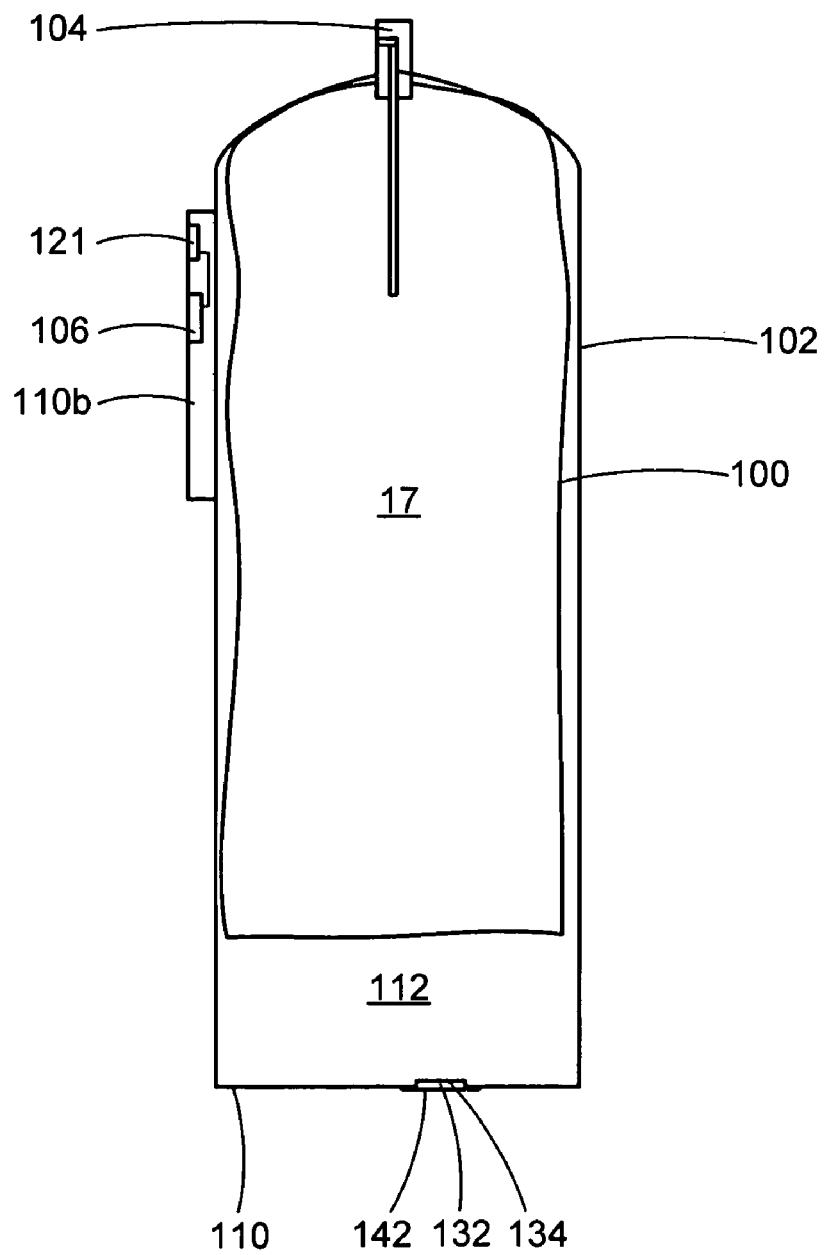
FIG. 2B illustrates a cartridge in accordance with another embodiment of the present invention.

FIG. 2B illustrates a cartridge 16b in accordance with another embodiment of the present invention. Cartridge 16b includes several features that may be optionally included with storage devices of the present invention.

Cartridge 16b includes a memory 106, which stores information relevant to usage of cartridge 16b. Memory 106 may comprise a mechanical, electrical and/or digital mechanism for information storage. In one embodiment, memory 106 includes a mechanical device. One suitable mechanical device comprises "break-off" pins that are altered each time cartridge 16b is used. Other forms of mechanical memory 106 may comprise discs or rods, which are removed or otherwise manipulated every time a storage device 16 is refilled. In another embodiment, memory 106 includes a visible identification tag that uniquely identifies cartridge 16. Various types of external identification tags are known in the art and may be used with this invention. Two examples of identification identifier tags include magnetic recording devices and optical bar codes. In this case, cartridge 16b includes an additional wall 110b affixed to the outside of housing 102 that holds and locates memory 106.

In one embodiment, memory 106 includes a digital memory source that permits a controller to read and write from the digital memory. In this case, cartridge 16b includes electrical connectivity 121 for digital communication between memory 106 and a processor or controller on device 11. For example, connector 104 may include female electrical slots 121. A mating connector 140 (FIG. 3A) for connector 104 then includes male leads positioned and sized to fit into slots 121. The electrical leads 121 contact when the connectors 104 and 140 interface and enable electrical and digital communication between a controller in device 11 and memory 106.

Cartridge 16b is considered 'smart' when memory 106 stores information related to the performance, status and abilities of cartridge 16b. A digital memory or chip allows an external controller or logic to read and write information relevant to usage of the cartridge 16b to memory 106. Reading from digital memory 106 allows reception and assessment of information in memory 106 to improve usage of cartridge 16b. For example, a computer that receives storage device 16 may inform a user that the storage device 16 is empty or how much fuel is left (or how much time on the system is available based on its power consumption and the amount of fuel remaining). Writing to a digital memory 106 allows information in memory 106 to be updated according to storage device 16 usage. Thus, if a user nearly depletes fuel 17 in cartridge 16b while powering a computer, the next user may be informed after the first computer writes an updated amount of fuel source 17 remaining in bladder 100 into memory 106.

Information stored in memory 106 that generally does not change with cartridge 16b usage and may comprise a) a fuel type stored in the cartridge 16b, b) a model number for cartridge 16b, c) security and handshake information for cartridge 16b, d) manufacture date, and/or e) a volume capacity for bladder 100 or cartridge 16b. The model number of cartridge 16b allows it to be distinguished from a number of similar devices. The security and handshake information may include an identification signature for cartridge 16b or the manufacturer of cartridge 16b. The security and handshake information may also employ encryption and security techniques that restrict a) cartridge 16b usage to designated devices, b) cartridge 16b usage to designated fuel cell system manufacturers, c) cartridge 16b usage to designated fuel cell system types, c) cartridge 16b usage to designated devices such as laptops, etc.

Transient information stored in digital memory 106 that changes according to the status and usage of cartridge 16b may include a) a current volume for fuel in the storage device, b) a number of refills when cartridge 16b is configured for re-usable service, c) the last refill date, d) the refilling service provider that refilled cartridge 16b, e) usage history according to a storage device identification, and f) hydrogen fuiel mixture information.

Cartridge 16b also includes one or more vents 132 in housing 102 that allow air to enter and exit in internal cavity 112 within housing 102 as bladder 100 changes in volume. Air vent 132 comprises one or more holes or apertures in a wall 110 of housing 102. In operation, as fuel 17 is consumed and drawn from cartridge 16b, bladder 100 collapses and creates a negative pressure in internal cavity 112 outside of bladder 100. Based on this negative pressure caused by a decreasing volume of bladder 100 (or increasing volume of internal cavity 112 outside bladder 100), air enters through air vent 132 into internal cavity 112 and displaces the decreasing volume of bladder 100. This prevents the pressure of fuel 17 in bladder 100 from decreasing and affecting the ability of cartridge 16b to provide fuel 17 at a substantially constant pressure. When filling cartridge 16b, positive pressure caused by an increasing volume of fuel 17 in bladder 100 causes air to exit through vent 132.

In another embodiment, cartridge 16b does not include a vent in the cartridge housing 102 and relies on a vent included in a valve or connector 104 that provides fuel source communication into or out of the storage device.

A filter 134 spans the cross section of vent 132 and intercepts air passing through vent 132. In one embodiment, filter 134 comprises a hydrophobic and gas permeable filter that prevents foreign materials from entering cartridge 16b. Materials blocked by filter 134 may include liquids and particles such as undesirable oils and abrasives. The hydrophobic filter also prevents fuel 17 from escaping housing 102 in the event that bladder 100 develops a leak. Filter 134 may comprise micro porous Teflon or another micro porous material such as Teflon coated paper. A sintered metal filter, for example one with a 3 micron pore size, may also be used. One suitable filter 134 includes micro porous "Gore Tex" Teflon as provided by WL Gore Associates of Elkton, Md.

A mechanical shield 142 spans and covers vent 132 and prevents foreign bodies from entering housing 102 through vent 132. In a specific embodiment, vent 132 is recessed into wall 110 such that mechanical shield 142 is flush with the outer surface of housing 102. As shown, filter 134 is located internal to shield 142 such that shield 142 mechanically protects filter 134. In one embodiment, mechanical shield 142 includes a flame suppressor or a suitable means of flame suppression. The mechanical shield 142 then prevents flame propagation into or out from interior cavity 112. One suitable mechanical shield 142 includes cut to size 180×180 mesh stainless steel screen as provided by McNichols of Tampa, Fla.

Cartridge 16b may also include other features such as a pressure relief valve that limits pressure in the bladder or cartridge, a fuel filter that intercepts fuel 17 as it leaves bladder 100 and before it leaves connector 104, a fire retardant foam disposed in bladder 100, and a wireless identification (ID) tag for memory 106, for example. These and other features suitable for use with a cartridge of the present invention are described in commonly owned and co-pending U.S. patent application Ser. No. 10/877,766 and entitled "PORTABLE FUEL CARTRIDGE FOR FUEL CELLS", which was incorporated by reference above.

Figure 3A:
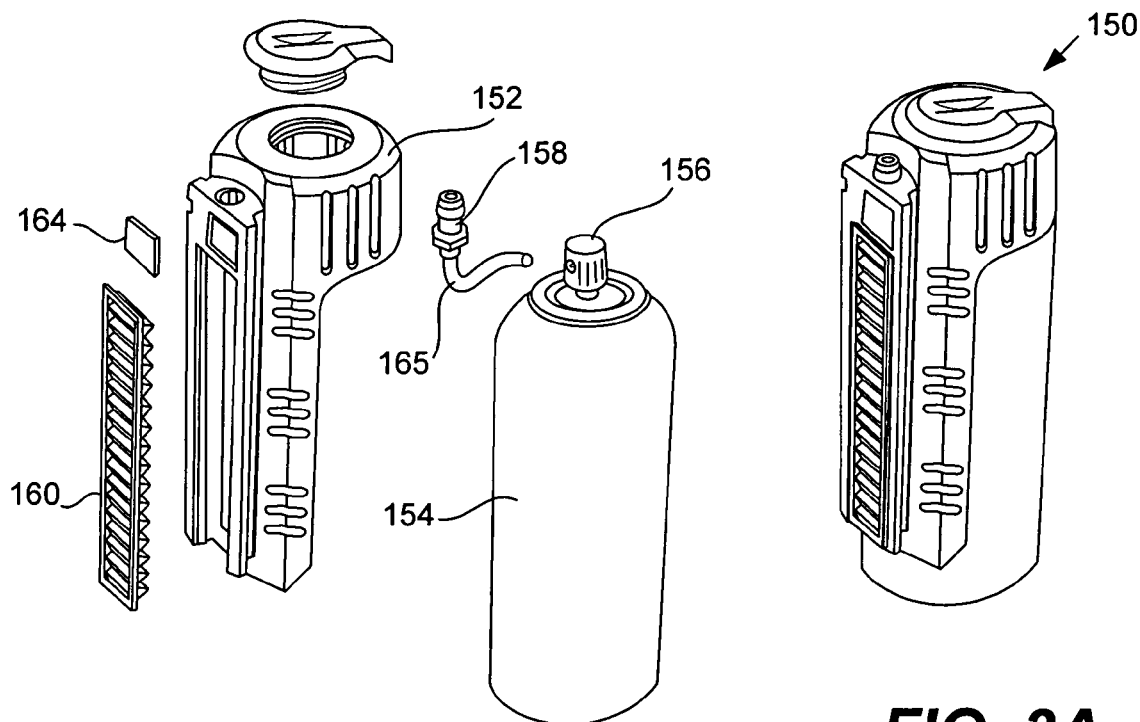
FIG. 3A illustrates a cartridge in accordance with a specific embodiment of the present invention.
Figure 3B:
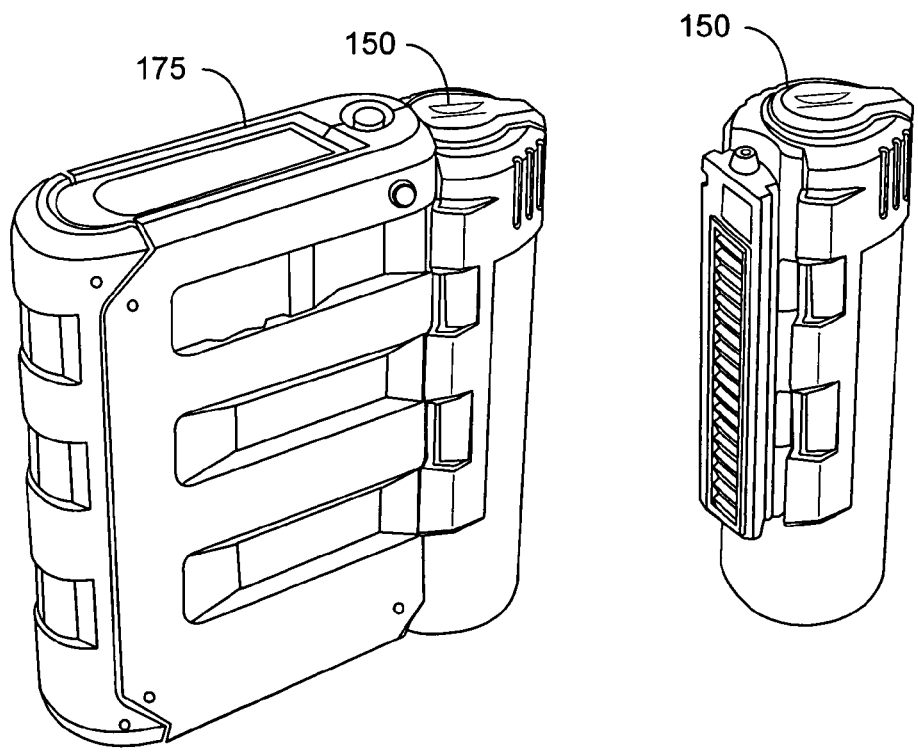
FIG. 3B illustrates cartridge mechanically coupled to an exemplary portable fuel cell package in accordance with another specific embodiment of the present invention.

FIG. 3A illustrates a cartridge 150 in accordance with a specific embodiment of the present invention. FIG. 3B illustrates cartridge 150 mechanically coupled to an exemplary portable fuel cell package 175. Cartridge 150 includes a fluid transfer valve 156, a connection valve 158, an assembly housing 152, a main housing 154, one or more filters 160, mechanical interface components such as a slide interface 162, and a digital chip 164.

Housing assembly 152 attaches to main housing 154. Housing assembly 152 couples to main housing 154; both housing portions provide mechanical protection for other components of cartridge 150. Filter intercepts air inlet to the package to remove particulates from the inlet air stream provided to a fuel cell in the package. Housing assembly 152 also permits connectivity with a fuel cell device, houses various components included in cartridge 150, and adds structural integrity to cartridge 150. Housing assembly 152 may include a molded and rigid plastic, for example. In one embodiment, assembly housing 152 surrounds main housing 154 and provides mechanical protection for main housing 154. In another embodiment, and as shown, assembly housing 152 only partially surrounds main housing 154 and main housing 154 includes its own walls that contain and mechanically protect the internal bladder and fuel. In this case, housing 154 is substantially cylindrical. Other geometries for assembly housing 152 and main housing 154 may be used.

In one embodiment, main housing 154 and bladder contained therein accommodate high-pressure usage, intentional or otherwise. Unintentional high pressures may result from high temperatures, for example. Thus, if cartridge 150 is left in a location such as a car dashboard on a hot day where temperatures may cause fuel inside the cartridge to evaporate and pressure in the bladder or cartridge to rise, then cartridge 150 may accommodate the rise in pressure with a passive pressure release. In a specific embodiment, the housing includes a hole that allows pressure to escape from the housing as the bladder expands.

Housing assembly 152 includes one or more mechanical interface components that allow detachable coupling to a fuel cell package (e.g., see FIG. 3B). As shown, assembly housing 152 includes a slide interface 162 that interfaces with a mating groove on fuel cell package 175. To couple cartridge 150 and package 175, slide interface 162 slides vertically (from the bottom) into a mating groove on the fuel cell package 175. The sliding interface permits a sliding relationship between the cartridge 150 and package 175—and multiple positions between the two while still being slidably coupled. One suitable sliding interface embodiment is described in further detail below with respect to FIGS. 4A-4F.

A latching interface may be included to lock and hold cartridge 150 in one or more positions relative to package 175. The latching interface lets a user know (e.g. acoustically and kinesthetically) when the two are coupled together or at some desired position relative to each other. One suitable latching interface embodiment is described in further detail below with respect to FIGS. 5A-5C.

Fluid transfer valve 156 opens to the inner bladder and permits fluidic communication with the bladder. As shown, fluid transfer valve 156 is disposed at one end of the cylindrical main housing 154. In one embodiment, fluid transfer valve 156 is a contact valve, which when depressed, permits flow of fuel from cartridge 150; and when not depressed, the contact valve prevents the flow of fuel from the cartridge. As shown, contact valve 156 outputs the fuel at about a 90-degree angle relative to fluid communication with a bladder included in main housing 154. In another embodiment, fluid transfer valve 156 outputs the fuel in an upward direction. Contact valves suitable for use with the present invention are available from a wide variety of vendors. Suitable commercially available valves are used in aerosol and shaving products, for example, and many are well suited for use herein.

In this case, fluid transfer valve 156 provides the fuel to a line 165 internal to assembly housing 152 that communicates the fuel to a connection valve 158. The connection valve 158 acts as a connector for cartridge 150 and interfaces with a downward facing mating connector on package 175. When assembly housing 152 couples to package 175, connection valve 158 permits transfer of fuel between cartridge 150 and package 175. Specifically in this case, connection valve 158 communicates the fuel from line 165 to a mating connector and fuel line in package 175. The mating connector may be disposed on the fuel cell package 175, or another device such as a fuel cell, or a portion of an electronics device such as a laptop computer. When there is no contact between the mating connector and connection valve 158, the plumbing line between cartridge 150 and package 175 is disconnected. When connected, the plumbing line is open for transfer of fuel. In a specific embodiment, the cartridge assembly uses a commercially available contact valve or connection valve 158. One suitable connection valve that permits high pressure and uses contact to open and close fluid communication is a Schrader valve. Suitable commercially available Schrader valves are available from a wide variety of vendors. Other valves may be used. In addition, although connection valve 158 is shown pointing upwards, other orientations are possible. In a specific embodiment, both fluid transfer valve 156 and connection valve 158 include contact actuation. In addition, both valves 156 and 158 may be designed or configured to permit high-pressure usage in the cartridge, bladder, and plumbing.

Cartridges of the present invention may include one or more commercially available components. Using commercially available products allows the present invention to use mass produced, readily available, and proven technology. Off-the-shelf components may also reduce cost for a cartridge.

Aerosol cans, for example, are a proven technology suitable for use with housing 102 to store a hydrogen bearing fuel. Conventional aerosol containers are also well-suited for high pressure capabilities, such as 210-313 psig and above. Conventional aerosol containers also include a relatively high evacuation efficiency and may rely on commercially automated filling equipment. Other commercially available components suitable for use in a hydrogen fuel cartridge include those used in the shaving industry, those use in portable lighters, and those used for pressurized air delivery (e.g., to power a nail gun). These devices often include commercially available components suitable for use in a cartridge of the present invention such as: commercially available cartridge housings (also referred to as 'canisters' or 'cans', bladders, commercially available heads (or 'mounting caps') that attach to the canisters, nozzles, and so on. Many commercially available nozzles include contact valves that permit binary fluid communication with/without contact. One suitable supplier of aerosol products including canisters and contact nozzles is Precision Valve, Inc. of Yonkers, N.Y.

Many such commercially available devices permit storage of liquids and fuels at high pressures. Some commercially available storage devices are capable of handling pressures up to about 200 psi. Stronger commercially available storage devices handle pressures up to about 500 or 600 psi. Using commercially available high-pressure components for the storage device also permits the present invention to use proven technology in a relatively new field.

In a specific embodiment, the cartridge housing includes commercially available aluminum components that crimp and seal together. For example, the housing may include a top aluminum head portion (also referred to as a 'mounting cup' that crimps to a cylindrical aluminum housing (also referred to as a 'can'. This advantageously seals the head to the cartridge housing. One or more components may be added internally to the aluminum cartridge housing before the seal is made. For example, a bladder may be added before the two parts are joined. The crimped connection then secures and seals the bladder.

In a specific embodiment, the cartridge comprises one or more of the following materials: polycarbonate, ABS, PET, HDPE, or PCABS for housing 152; steel or aluminum or another suitably rigid metal or material for housing 154; tinplate/polypropylene/ nylon for valve 156; and nylon or polypropylene for the bladder. Other materials may be used. The fuel cartridge may also include a commercially available 202 bag accessed using a commercially available aerosol valve. One of skill in the art is aware of the wide range of the aerosol can designs, bags and valves, and the fuel cartridge is not limited to any particular design.

The present invention also improves mechanical interface between a cartridge and a device that couples to the cartridge to receive fuel. The interface may include one or more of: a sliding interface between a cartridge and package, a latching interface that holds the cartridge in one or more positions relative to the package, and/or security features that prevent unintended detachment or attachment, for example.

FIGS. 4A-4F illustrate a sliding coupling that permits multiple positions between a cartridge 156 and package 151 in accordance with one embodiment of the present invention. In this case, package 151 is a portable fuel cell device that internally includes a fuel processor and fuel cell.

The sliding coupling uses mating sliding interfaces on cartridge 156 and package 151. As shown in FIG. 4A, cartridge 156 includes a sliding interface 152 that is sized to fit within—and linearly translate within—a mating sliding interface 154 on package 151. Sliding interface 154 includes a pair of opposing channels 154*a* and 154*b* that are sized to receive sliding interface 152 therein. Channels 154*a* and 154*b* extend parallel to each other to form a pair of opposing linear rails. In this case, the sliding interface 152 includes a linear member that fits within opposing channels 154 and linearly translates within the opposing linear rails (normal to the page as shown in FIG. 4A, and in direction 160 and shown in FIG. 4B). In one embodiment, sliding interface 152 and mating sliding interface 154 on the device are sized and adapted to provide frictional resistance when the cartridge sliding interface 152 moves within interface 154 on package 151. The two sliding interfaces 152 and 154 thus cooperate to permit a user to insert cartridge interface 152 within device interface 154 and slide cartridge 156 relative to package 151.

The sliding interface 152 and mating sliding interface 154 thus cooperate to provide detachable mechanical coupling between cartridge 156 and package 151, which when cartridge 156 and package 151 are coupled together, provides relative sliding between cartridge 156 and package 151 in a direction determined by the sliding interface and mating sliding interface.

Length of the sliding interfaces may be varied based on design. In one embodiment, sliding interface 152 on cartridge 156 travels the full length of the cartridge. In another embodiment, sliding interface 152 extends only a fraction of the length of cartridge 156. Similarly, the mating sliding interface 154 on package 151 may travel the full length of the side receiving the cartridge, or some fractional portion.

As shown, sliding interface 152 attaches to a header 162 disposed near the top of a cylindrical cartridge 156. Header 162 includes a set of walls and structures that add to the housing assembly for cartridge 156 and permit additional features to be added to cartridge 156. The housing assembly for cartridge 156 thus includes header 162 and a cylindrical outer canister 164. A fuiel communication valve 166 is disposed at the top end of the cylindrical canister 164 (FIG. 4A), and includes a contact valve that permits fluid flow from cartridge 156 by pressing valve 166. Header 162 extends above and around valve 166 to prevent unintended contact with valve 166.

The sliding interfaces 152 and 154 permit a number of relative positions between cartridge 156 and package 151 along a linear track defined by the interfaces.

In one embodiment, cartridge 156 and package 151 include a latching relationship that permits the cartridge 156 to be held at multiple positions along the sliding interface. One position permits fuel to be communicated from cartridge 156 to package 151.

For cartridge 156 and package 151, the latching relationship is obtained using a pivotal latch 168 disposed on the outside of package 151. Latch 168 pivots about a rotational joint 170. A recess 178 in latch 168 fits over a knob 180 on an outside surface of interface 154*b*. When latch 168 is pivoted into an open position (FIGS. 4D or 4C), recess 178 is free of knob 180 and cartridge 156 may slide relative to package 151. Conversely, when latch 168 is in a closed position, recess 178 is fixed over a knob 180, which prevents cartridge 156 from sliding relative to package 151.

FIG. 4A shows a cartridge 156 before coupling with package 151; the two objects have not been connected and are completely free to move relative to each other. Thus, the sliding interfaces 152 and 154, along with latching as described below, permit full detachable coupling between cartridge 156 and package 151.

FIG. 4B shows the sliding interface 152 of cartridge 156 inserted within the mating sliding interface 154 attached to the outside of package 151. This partially couples cartridge 156 and package 151, with the exception of linear translation according to interfaces 152 and 154. A user may now slide cartridge 156 relative to package 151. Also, latch 168 has been flipped or pivoted into an open position that allows cartridge 156 to slide upwards. In other words, when latch 168 is in its locked position, it also prevents cartridge 156 from fully sliding up within mating sliding interface 154 on package 151.

FIG. 4C shows cartridge 156 after it is pushed up along the sliding interface while latch 168 is in an open position. Cartridge 156 is pushed up until valve 166 meets a mating connector 172 (shown by dotted lines in FIG. 4D). In one embodiment, valve 166 is a contact valve, and mating connector 172 is positioned on an arm 174 such that when cartridge 156 is pushed all the way upwards along the sliding interface, mating connector 172 pushes down on valve 166 and opens the contact valve. Arm 174 thus positions mating connector 172 such that a) mating connector 172 pushes down on valve 166 and opens the contact valve, and b) plumbing lines within mating connector 172 and valve 166 spatially align and permit fluidic communication between cartridge 156 and plumbing within package 151. Cartridge 156 or package 151 may also include one or more mechanical stops that prevent further motion past suitable contact between valve 166 and mating connector 172 to open the fuel line. In this case, header 162 stops upward motion of the cartridge when the header contacts arm 172.

A notch 176 also facilitates holding and positioning of cartridge 156 relative to package 151. Notch 176 is a small mechanical structure sized and positioned such that it permits motion of cartridge 156 under certain conditions and prevents motion otherwise. For example, notch 176 may be triangularly shaped to permit cartridge to pass over it in one direction, while preventing the cartridge to pass over it in the opposite direction without assistance (e.g., from latch 168). In one embodiment, latch 168 is spring-loaded such that once cartridge 156 passes detent 176 along the sliding interface, latch 168 automatically drops back into its locked position.

Figure 4F:
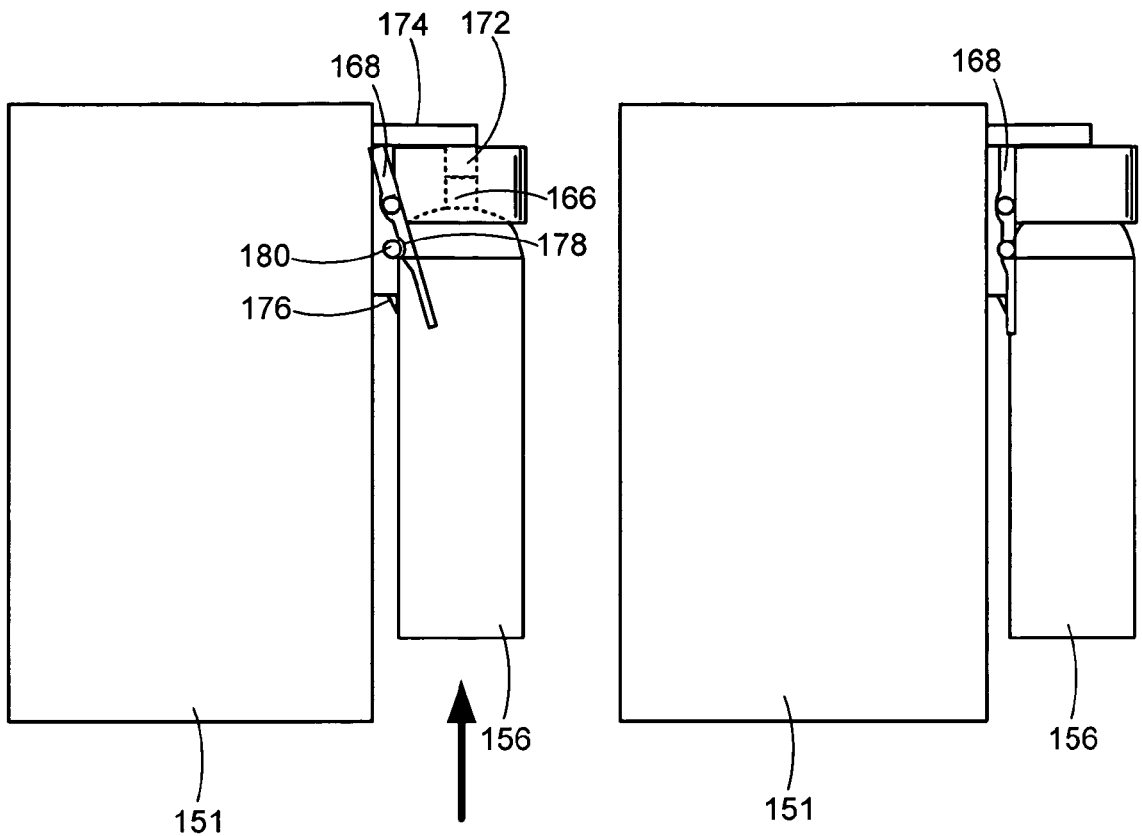
Figure 4F:
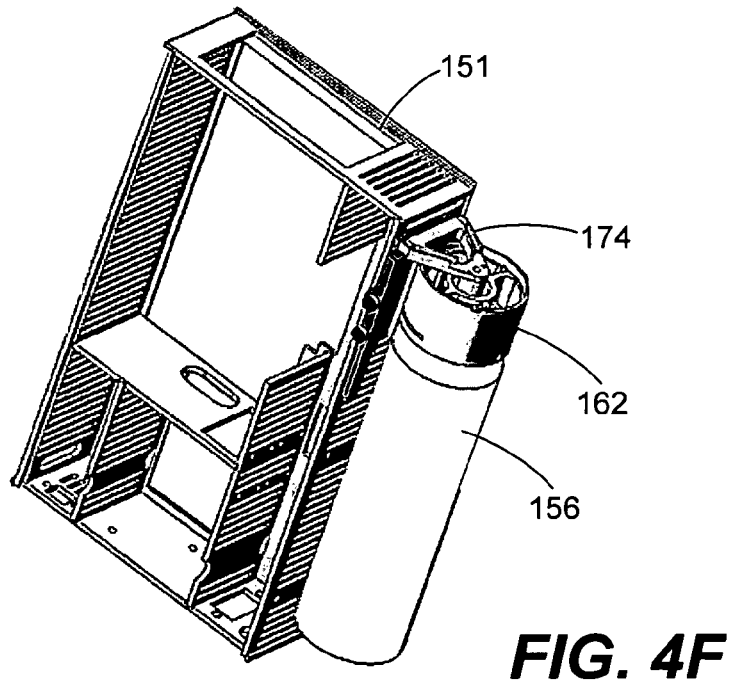

FIGS. 4D and 4F show cartridge 156 after it is pushed up along the sliding interface and latch 168 has moved to a locking position. Cartridge 156 is linearly held along the sliding interface when latch 168 is in this locked position, and fuel may flow through valve 166 into mating connector 172.

Cartridge 156 may be released from its locked position by opening latch 168, and pulling cartridge 156 down along the sliding interface. Pressing the top side or pulling out the bottom side opens latch 168. In one embodiment, this two-step detachment is configured with suitable spring-loaded resistance in pivoting of latch 168 and suitable frictional resistance along the sliding interface such that detachment of cartridge 156 from package 151 requires two hands.

In one embodiment, movement of cartridge 156 upwards towards the fueling position shown in FIG. 4E also opens an access/security door on package 151. The door prevents open access into package 151 and accidental opening when a cartridge is not interfacing with package 151. When cartridge 156 is pushed up into the fueling position, a notch or mechanical trigger on cartridge 156 opens a lock on the access door or package 151 that is configured to receive the mechanical trigger.

Figure 5A:
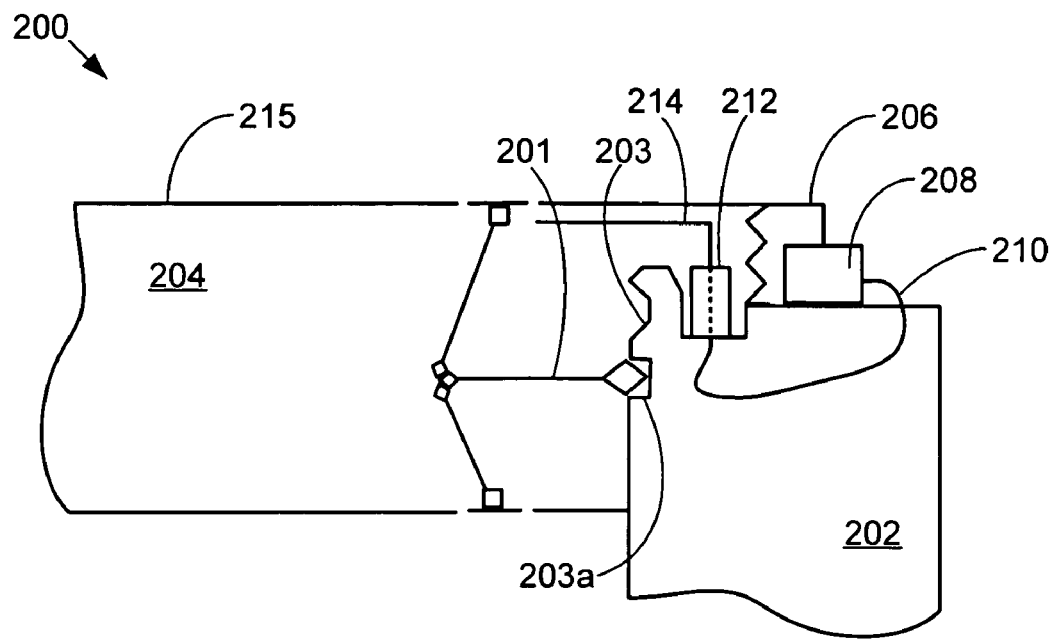
FIGS. 5A-5C illustrate multiple positions for a latching interface for use with a fuel cartridge and a fuel cell package in accordance with another embodiment of the present invention.
Figure 5B:
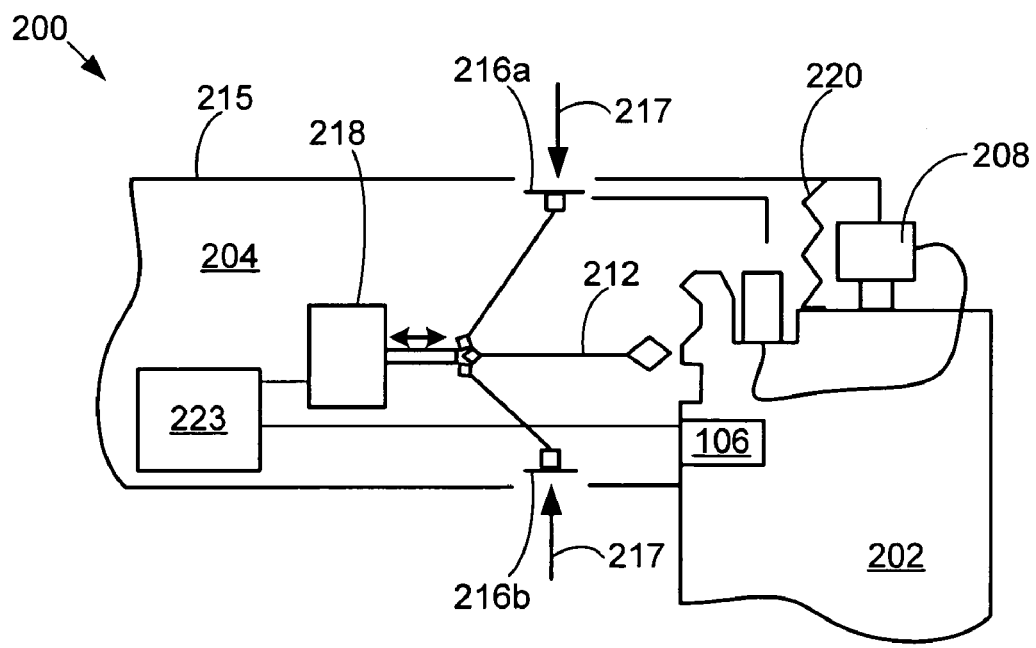
Figure 5C:
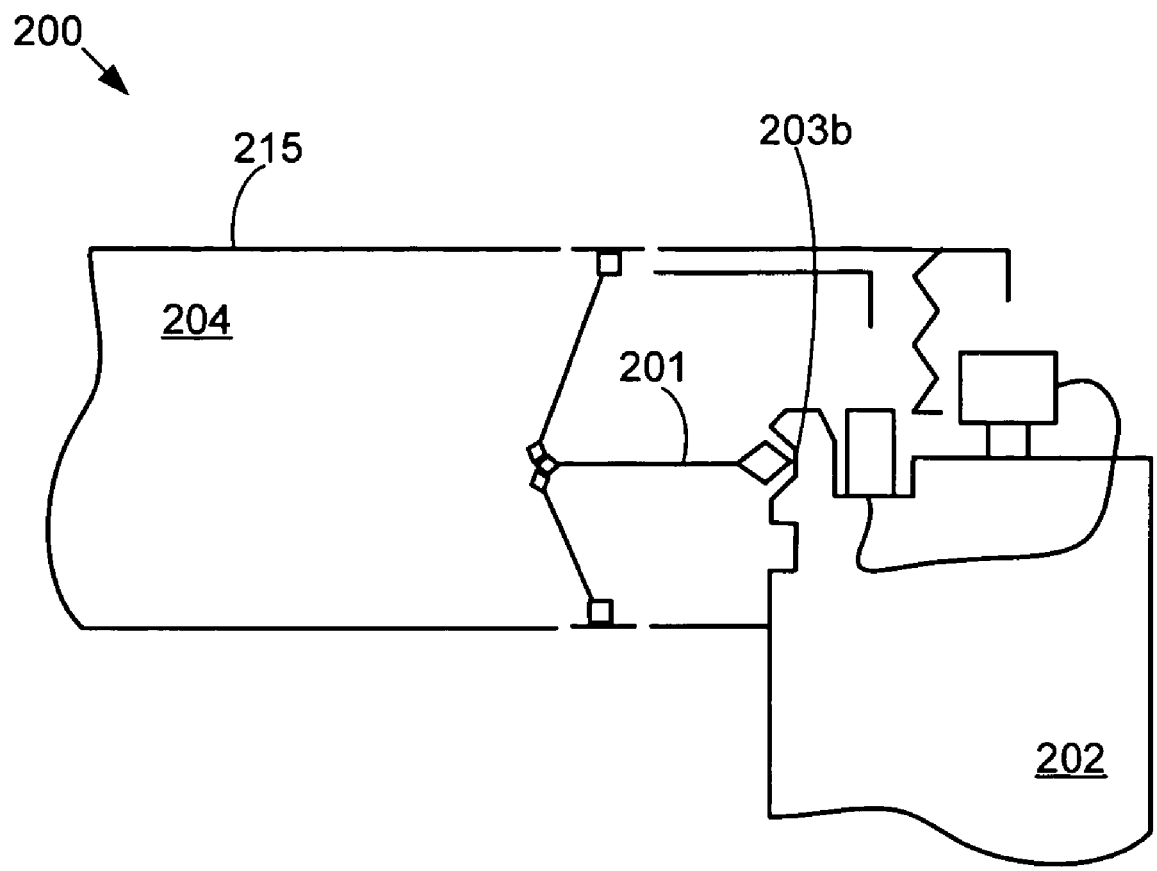

The present invention may include latching and locking mechanisms other than that shown in FIGS. 4A-4F, which do not necessarily employ a sliding relationship between the cartridge and device. FIGS. 5A-5C illustrate multiple positions for a latching interface 200 for use with a fuel cartridge 202 and a fuel cell package 204 in accordance with another embodiment of the present invention. For sake of illustration, cartridge 202 has been rotated 90 degrees relative to package 204; their usual orientation would resemble that depicted in FIG. 4A.

Latching interface 200 includes a cartridge latching interface 203 configured to cooperate with a mating latching interface 201 on package 204 so as to hold cartridge 202 in multiple positions relative to package 204. FIG. 5A shows cartridge 202 mechanically coupled to (locked) and in fluid communication with (loaded) package 204. FIG. 5C shows cartridge 202 locked to package 204, but unloaded in that plumbing communication between cartridge 202 and package 204 has been disconnected. FIG. 5B shows cartridge 202 both unlocked and unloaded.

The first position permits fluidic communication between the cartridge and the device. As shown in FIG. 5A, latching interface 200 physically and mechanically locks cartridge 202 in a full connection position that permits fluidic communication between cartridge 202 and a fuel cell system in package 204. More specifically, in the locked position shown in FIG. 5A, an actuator or contact arm 206 presses contact valve 208 on cartridge 202. This opens fluid communication along line 210, which transmits the fluid to valve 212. Contact valve 208 opens to a bladder within the fuel cartridge 202; valve 212 opens to mating plumbing on package 204 and to a fuel line 214 that communicates the fuel into a fuel cell system in package 204 (e.g., a pump or fuel processor).

The locking and latching interface 200 interface also permits additional positions that provide partial connection/disconnection. The intermediate position shown in FIG. 5C (also referred to as a 'detent' position') maintains at least partial mechanical coupling between the cartridge and the device—but does not permit fluidic communication between cartridge 202 and package 204. The intermediate disconnection rests between a) full connection and fluidic communication and b) full disconnection where the cartridge is fully separated from package 204.

This intermediate disconnection is useful in many instances where it is advantageous to have the cartridge 202 and package 204 mechanically coupled but not in fluidic communication. For example, cartridge 202 and package 204 may be left in a hot environment where fuel internal to cartridge 202 gets hot and builds pressure within cartridge 202. With full connection and open fluid communication (FIG. 5A), the high pressure may force the fuel from cartridge 202 into a fuel line in the package 204 or to a fuel processor or DMFC fuel cell in the package that is currently not in use, which may damage some fuel processors and DMFC fuel cells. As will be described below, the package or cartridge may also include an actuator and/or sensor that pushes cartridge 202 into the intermediate position, e.g., when a threshold temperature has been reached in cartridge 202 or when the fuel cell system in package 204 is off.

In one embodiment, latching interface 200 employs a sliding interface between cartridge 202 and package 204, such as that described above. The sliding interface allows partial mechanical coupling between the storage device and fuel cell package in positions such as that shown in FIGS. 5B and 5C. In other words, the sliding interface permits one degree-of-freedom motion between the two objects in the absence of a force that holds the two from moving along the sliding interface, but maintains mechanical coupling in all other dimensions save along the sliding interface. FIGS. 5A-5C will now be discussed as including a sliding interface.

Mating latching interface 201 includes a male latch 201 that is positionable within a set of female recesses 203. The female recesses 203 are included on the walls of a housing 215 for package 204 and are adapted (positioned and sized) to receive male latch 201. Male latch 201 and female recesses 203 form a locking and latching interface that holds one or more positions of cartridge 202 relative to package 204. Male latch 201 thus acts as a controllable mechanical lock that prevents movement of cartridge 202 along a sliding interface when latch 201 is inserted within recessed features 203. This prevents motion of cartridge 202 in a direction normal to the male latch 201, which also coincides with a direction of contact with contact valves 212 and 208.

The set of female recesses 203 includes two recesses 203a and 203b. More recesses 203 may be included to permit more latched positions. In general, each female recess 203 includes a receptive structure that permits latch 201 to fit therein such that movement is prevented between two bodies attached to latch 201 and recess 203. In this case, each recess 203 includes a pocket or indent in a housing wall of cartridge 202.

Together, latch 201 and recesses 203 provide two holding positions for cartridge 202 relative to package 204: a first position is shown in FIG. 5A, when latch 201 interfaces with a first recess 203a; and a second position is shown in FIG. 5C, when latch 201 interfaces with a second recess 203b.

As shown in FIG. 5A, latch 201 rests in recess 203a and holds cartridge 202 in a first position relative to package 204. Recess 203a corresponds to a first position of cartridge 202 relative to package 204 that permits contact with valves 208 and 212 and permits fluid provision from cartridge 202. In this case, actuator 206 (which may be controllable or not; see below) presses the contact valve in the first position in permits fluid flow from the cartridge. Fluid flow may still be subject to pressure on the fuel, such as a pump included in the fuel cell package that draws the fuel from a bladder, or a mechanism included in the storage device that pushes the bladder and forces out the fuel. Thus, cartridge 202 is held in a first position along and 'locked' so as to permit fluid communication with (or 'loaded' to the plumbing. 214 in package 204.

Latch 201 and recess 203b also cooperate to hold cartridge 202 in an unloaded position that does not permit plumbing communication between cartridge 202 and package 204 (FIG. 5C). Both valve 208 and valve 212 have been released, thereby doubly cutting off fuel flow from cartridge 202 when male latch 201 rests in recess 203b.

Recess 203b corresponds to a locked but unloaded position of cartridge 202 relative to package 204 where cartridge 202 is held and mechanically coupled to package 204—but the fuel cannot flow therebetween. This second position allows temporary disconnection of the fuel line when cartridge 202 is not in use. The locked but unloaded position also permits cartridge 202 to be held and coupled to package 204, even though fluid flow between the two is not permitted or occurring.

Latch 201 is positionable such that a) it rests in one of female recesses 203, or b) it retracts out of female recesses 203 and permits relative motion between cartridge 202 and package 204 along the sliding interface. FIG. 5B shows latch 201 in a retracted position that permits movement of cartridge 202. Cartridge 202 is now unlocked and free to move between female recesses 203a and 203b.

Latch 201 permits manual and/or automated decoupling of cartridge 202 and package 204. One suitable manual locking and latching interface includes one or more manual eject buttons 216. In this case, package 204 includes opposing manual eject buttons 216a and 216b on opposing walls of housing 215. Simultaneously depressing both manual eject buttons 216a and 216b (as shown by arrows 217 in FIG. 5B) allows a person to disengage a latch 201 and thereby partially and/or fully detach cartridge 202 and disconnect fuel provision. In one embodiment, this detachment requires a second hand to move the cartridge 202 relative to package 204, which is held by the same hand that is depressing buttons 216a and 216b. In another embodiment, package 204 includes a sliding latch or single button that allows a person to perform the same unlocking of latch 201 (e.g., by pushing the latch with a thumb).

In another embodiment, package 204 also includes an automated unload device that allows computer control to unlock and unload cartridge 202. This may be done, for example, when a fuel cell included in package 204 stops generating electrical energy and a fuel processor included in the package stops processing fuel.

FIG. 5B shows an actuator 218 for positioning latch 201. For example, the actuator 218 may include a solenoid that responds to digital control. A controller included with package 204 provides digital instructions to the actuator 218 to position latch 201 as desired.

As shown, latching interface 200 includes a spring 220 that is configured in compression when latch 201 is in recess 203a. Thus, spring 220 continually pushes cartridge 202 away from the package when latch 201 is in recess 203a. In the absence of latch 201 being within recess 203a, spring 220 disconnects fluid communication by pushing cartridge 202 far enough away along the sliding interface such that valves 208 and 212 are released from contact.

Together, the actuator 218 and spring 220 cooperate to provide an automated means for disconnecting fluid communication between package 204 and cartridge 202. For example, when the fuel cell system within package 204 turns off, a fuel cell system controller 223 sends a message to actuator 218 to temporarily retract latch 201. Spring 220 then pushes cartridge 202 away. Controller 223 then sends a second message to actuator 218 to move latch 201 back into a holding position, so as to fall into recess 203b, thereby achieving a detent position described above. As shown, recess 203b a shaped with angled walls so as to permit a larger 'hit zone' for latch 201 to find positioning within recess 203b.

The detent position of FIG. 5C is useful during shutoff of a fuel cell or fuel processor included in package 204. For example, either device may be turned off when the fuel cell is not generating power or when one of the structures is overheating. The detent position may also be used when cartridge 202 is out of fuel. System diagnostics in package 204 may also eject cartridge 202 into the neutral detent position when a certain diagnostic condition or issue has arrived, such as an onboard leak.

In the event that cartridge 202 moves to an locked and unloaded position, or is mechanically unlocked or the contact valve was released by the spring, the locking and loading system may require a user to manually push or snap cartridge 202 back into a loaded position (FIG. 5A) to initiate and continue fuel provision into package 204.

Other detent latching mechanisms and control may be used. Another suitable manual locking and latching interface includes a screw-based interface near the top portion of a cylindrical storage device. The screw-based interface permits vertical translation between cartridge 202 and package 204 according to the rotational position of a head portion of cartridge 202 included in the housing assembly. The bottom side of the screw depresses (or not) contact valve 208 and/or 212 based on its rotational position. The rotational position may be controlled manually and/or by a motor that turns the cartridge for automatic disconnect.

In another embodiment, a latching interface includes multiple male latches 201. In addition, while package 204 is shown including male latch 201 and cartridge 202 includes female recesses 203, it is understood that the male latch and female recesses may be switched, namely, cartridge 202 includes one or more male latches and the package includes the set of female recesses 203.

In another embodiment, the locking and latching interface moves an actuator that presses a fluid transfer valve, such as a contact valve on the cartridge. This is in contrast to the embodiment described above, where latching mechanism 200 permits cartridge 202 to move, which serves to regulate contact with the contact valves 208 and 212 and control fluid provision from cartridge 202. In another embodiment, the locking and latching interface actuates one of valves 208 and 212 directly.

And while not shown, latching interface 200 also permits full disconnection between cartridge 202 and the package 204. In this case, male latch 201 is retracted and cartridge 202 is withdrawn from the sliding interface so as to be fully mechanically decoupled from package 204.

Returning to FIG. 5B, controller 223 digitally communicates with memory 106 for bi-directional communication therebetween. Controller 223 may read any information stored in memory 106 such as a fuel type stored in cartridge 202, a model number for cartridge 202, a volume capacity for cartridge 202, a number of refills provided to cartridge 202, the last refill date, the refilling service provider, and a current volume for the storage device. Controller 223 may also monitor fuel levels in cartridge 202, and activate actuator 218 when cartridge 202 has been depleted. As described above, controller 223 may also eject cartridge 202 in other conditions.

The designs and shown in FIGS. 5A-5C also illustrate another embodiment of the present invention that uses two contact valves 208 and 212 for fluidic communication between a cartridge and a fuel cell device that the cartridge provides fuel to. Both valves 208 and 212 need to be at least partially depressed in order to communicate fluid into or out of cartridge 202. This prevents accidental contact with either one of valves 208 and 212 for from opening fluidic communication with cartridge 202.

Connection valve 212 includes a contact valve that provides fluid communication, with contact, from cartridge 202 to fuel line 214 in package 204. The amount of contact needed to establish fluid communication will depend on a particular valve design, as one of skill in the art will appreciate.

Contact valve 208 provides the fuel from internal components of the cartridge 202 (such as a bladder) to the connection valve 212. When pressed, contact valve 208 permits fuel source communication. When not pressed, contact valve 208 prevents fuel source transfer.

In one embodiment, an actuator 206 included in package 204 controllably depresses contact valve 208 when cartridge 202 is mechanically coupled to package 204 in the locked position of FIG. 5A. Thus, even when cartridge 202 is in a locked or fluid-ready position, actuator 206 permits controllable depression of contact valve 208. This permits a controller included in package 204, such as a commercially available processor configured to run on stored instructions from memory, to activate actuator 206 as desired and open and close fluid communication between cartridge 202 and package 204. In another dual valve embodiment, actuator 206 is a fixed mechanical structure that simply pushes on the contact valve when cartridge 202 is in a fluid-ready position.

When both valves 208 and 212 are open, fuel travels from cartridge 202 and bladder contained therein to fuel line 214. Thus, only when the actuator is activated and both the connection valves are depressed is the fuel able to flow (with the assistance of a pressure source).

In another embodiment, the present invention provides portable fuel cartridges that deny manual access to a fuel line, contact valve or other internal components—but permit a fuel cell device to access the fuel line or valve. In other words, the cartridge is designed to prevent a person from accessing fuel in the absence of destroying the cartridge or its outer housing.

In this case, the housing prevents access to the cartridge connector without a key. The key is included with the mating connector or the device, and enables access to the cartridge connector when the cartridge is connected to the device. FIGS. 6-8 illustrate various cartridges that require mechanical keyed access in accordance with several embodiments of the present invention.

Figure 6A:
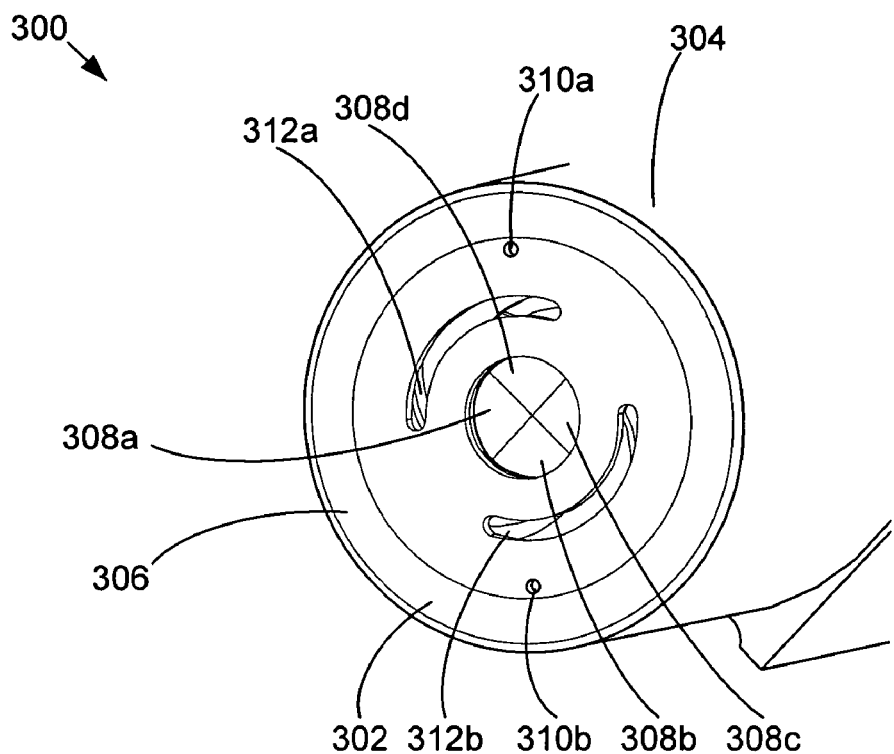
FIGS. 6A and 6B show a cartridge with key-based access to fluid communication of a cartridge in accordance with one embodiment of the present invention.
Figure 6B:
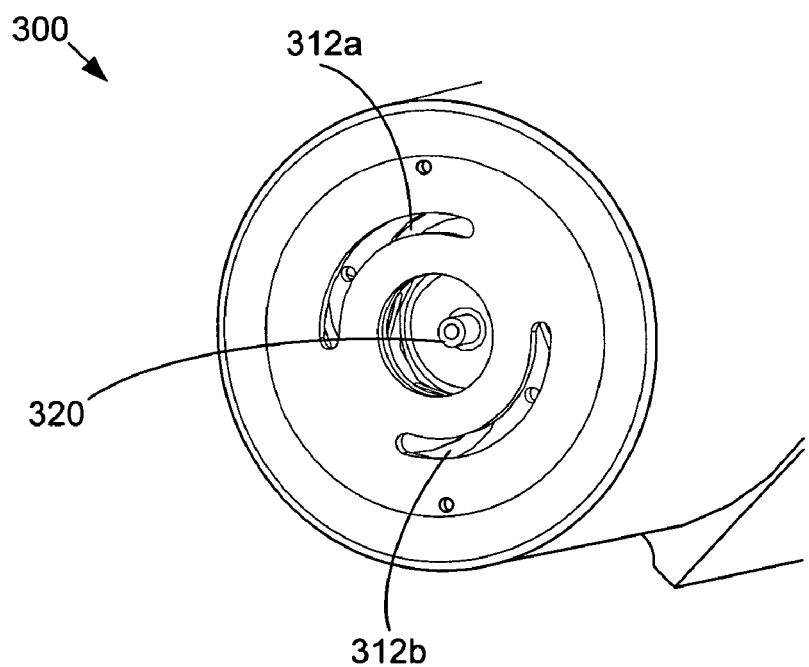
Figure 6C:
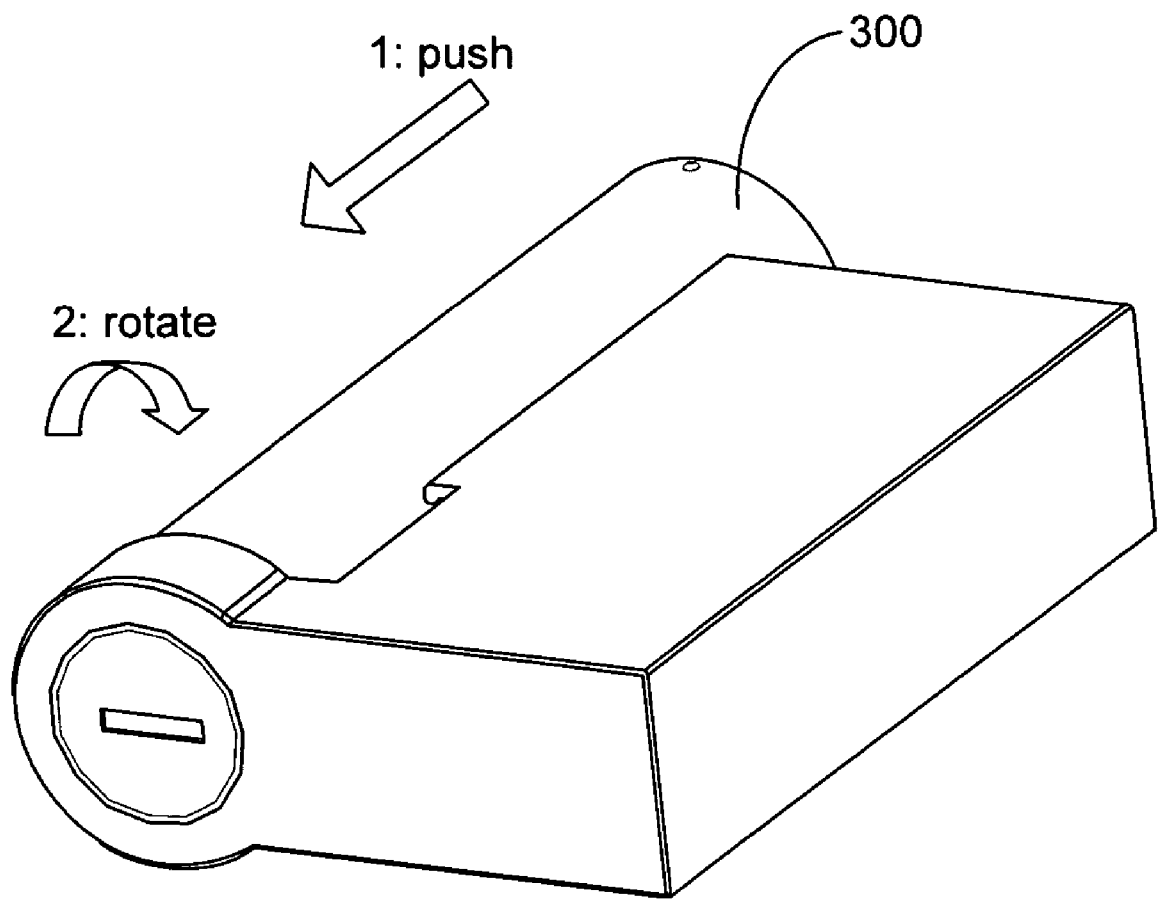
FIG. 6C shows a cartridge requiring a push and twist to interface with a package in accordance with a specific embodiment of the present invention.

In one embodiment, the housing includes at least one door that prevents access to a cartridge fluid valve without the presence of a key. The key permits the door(s) to be opened when the cartridge is connected to the device. FIGS. 6A and 6B show a cartridge 300 including keyed access doors 308 in accordance with one embodiment of the present invention. An end portion 302 of cartridge 300 is shown and includes a housing 304, top plate 306, doors 308a-d, and spiral grooves 312a-b.

Doors 308a-d collectively form a shutter assembly or "iris" that includes two states: a closed shutter state (FIG. 6A) that prevents access to internal components of cartridge 300 behind the doors, and an open shutter state (FIG. 6B) that permits access to internal components of cartridge 300 behind the doors. For example, the open shutter state permits access to a contact valve 320.

Cartridge 300 includes a lockout feature that requires keyed access. Shutter assembly opens as follows: 1) a mating connector inserts a pin into each of grooves 312a and 312b respectively; 2) the mating connector and cartridge turn relative to each other; and 3) circular motion of the radially expanding spiral grooves 312a and 312b causes each door 308a-d to radially open. FIG. 6 shows doors 308a-d after they have been retracted by twisting along grooves 312a and 312b. Rotating the cartridge relative to the mating connector in the opposite direction closes doors 308.

This keyed access of cartridge 300 requires the two pins on the mating connector to be spatially and sizably adapted to mate with grooves 312a and 312b. In one embodiment, the present invention rotates the cartridge 300. For example, a user may be required to activate cartridge 300 by pushing it into position, and then rotating it (see FIG. 6C). Alternatively, the mating connector may turn relative to cartridge 300 once the cartridge has been inserted to a predetermined location, e.g., using a motor. Cartridge 300 may also require a set of unlock pins to penetrate holes 310a and 310b before the grooves 312a and 312b are permitted to turn. Other mechanical key configurations are suitable for use.

In a specific embodiment, an engagement knob that couples cartridge 300 to the device is then turned. This causes cartridge 300 to be drawn in (see FIG. 6C), and the groove-drive pins to open doors 308a-d. As the cartridge is drawn in, valve 320 mates with an o-ring seal on the mating connector. This both creates a seal for a fuel path and opens a contact valve 320. Cartridge 300 is now engaged and the fuel path is open. A torsional spring that is spring loaded onto the engagement knob may be held in place by a detent attached to a solenoid or other mechanical or electro-mechanical actuator. At any time during the cartridge engagement to the device, the solenoid valve can be actuated, which removes the detent from the engagement knob and the torsional spring returns the engagement knob, and therefore the cartridge, to a disengaged position.

The keyed access of cartridge 300 is useful for several reasons. First, the keyed access ensures that cartridge 300 will only engage with compatible fuel cell systems that contain a properly adapted mechanical key. This permits a manufacturer of cartridge 300 to affect which devices (fuel cell systems, laptops, portable electronic devices, etc.) will work with cartridge 300. Conversely, this also permits a manufacturer of a fuel cell system to affect which cartridges will work with a properly adapted mating connector and fuel cell-package. Keyed access of cartridge 300 also impedes someone from readily accessing valve 320 and releasing fuel, which may prevent unwanted or unintentional release of fuel by a person. In this case, the keyed access includes multiple opening mechanisms that require a user to use at least three hands to manipulate and open the shutter assembly (one hand to hold the cartridge, one hand to operate each pin).

Figure 7A:
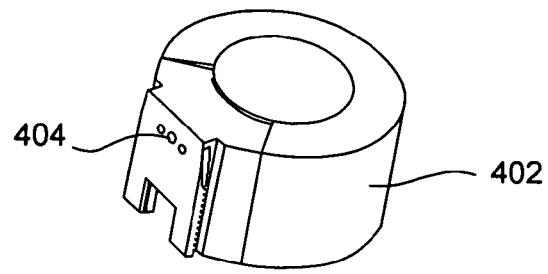
FIGS. 7A-C show a pin-based key access to fluid communication of a cartridge in accordance with a specific embodiment of the present invention.
Figure 7B:
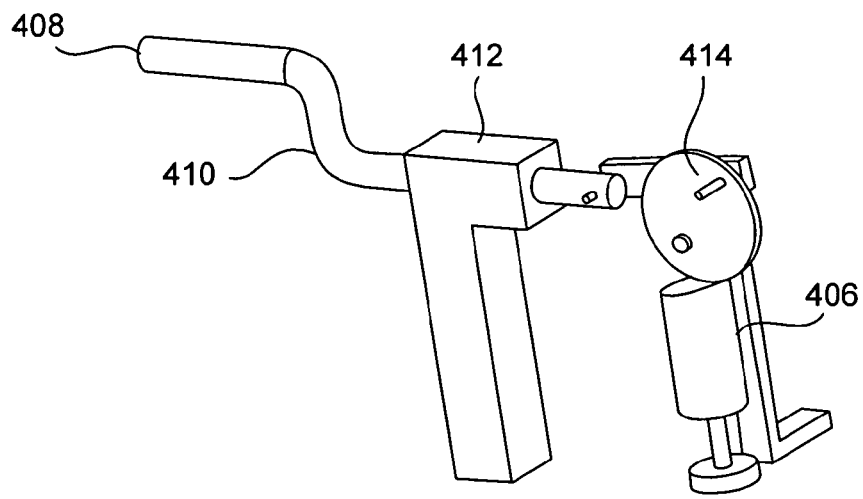
Figure 7C:
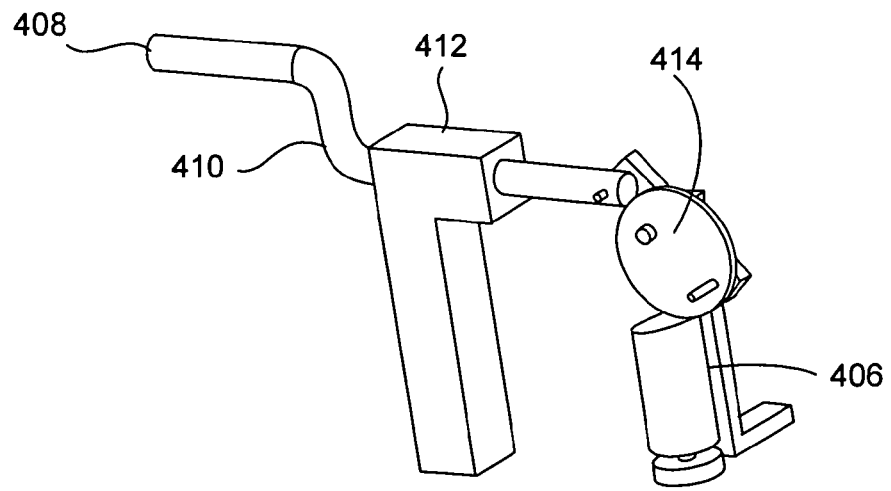

In another embodiment, a key access to a cartridge is accomplished using one or more pins that manipulate an internal mechanism that is configured to open and close a fluid valve. FIGS. 7A-7C illustrate a single key/pin 408 that permits access to a contact valve 406 when a cartridge is connected to a device that includes pin 408.

FIG. 7A shows a header 402 portion of a housing included with a portable fuel cartridge. A hole 404 penetrates one side of header 402, which interfaces with a mating connector on a fuel cell device. The mating connector includes a pin 408 for insertion into hole 404.

FIG. 7B shows pin 408, which penetrates hole 404, contacting a relay arm 410. Spacing block 412 allows relay arm 410 to linearly translate therethrough. Relay arm 410 connects on its end, on the other side of spacing block 412, to a positioning rocker 414. Linear translation of relay arm 410 causes a bottom portion of positioning rocker 414, which rests on contact valve 406, to translate up and down and thereby open and close contact valve 406. Thus, insertion of pin 408 into hole 404 pushes relay arm 410, which turns positioning rocker 414, and opens contact valve 406, as shown in FIG. 7C.

Any one of contact valve 406, positioning rocker 414, or relay arm 410 may be spring-loaded to return to their initial position before contact by key/pin 408. Thus, removal of pin 408 causes contact valve 406, positioning rocker 414, and relay arm 410 to return to their position as shown in FIG. 7B.

Variations to this single pin design are contemplated. For example, a cam or any other suitable device that translates a horizontal motion into vertical motion may replace positioning rocker 414. Multiple pins 408 may be used.

FIGS. 8A-8E illustrate another pin-based key access that manipulates an internal mechanism configured to open and close a contact valve for a cartridge in accordance with another specific embodiment of the present invention.

FIG. 8A shows the underside and internal components of a header 452 attached to one end of a cylindrical cartridge. Header 452 includes a valve actuation bar 454. Bar 454 opens and closes a contact valve on the cartridge, such as one of those described above. A proximate end of bar 454 includes a pin joint 456 that permits rotation of bar 454 about pin joint 456.

FIG. 8B illustrates a different underside view of header 452, which shows a distal end of bar 454 positioned by a flexure 458. FIG. 8E shows an isolated view of flexure 458. Flexure 458 includes two locations that hold the distal end of bar 454: a high position 460 and a low position 462. High position 460 holds the distal end of bar 454 between two angled surfaces 457 of flexure 458 (FIG. 8B). Laterally opening flexure 458 (separating angled surfaces 457) allows the distal end of bar 454 to move down to a low position 462 that holds the distal end of bar 454 on a flat portion 464 of flexure 458 (FIG. 8C). Moving the distal end of bar 454 from the high position to the low position causes outlet 466, which is positioned midway on bar 454, to translate up and down—and thereby controllably interface with a contact valve proximate to outlet 466.

FIG. 8D shows two keyholes 468 on the top portion of header 452. A mating connector then inserts pins into keyholes 468. As can be seen in FIG. 8B, inserting the pins pushes on angled surfaces 457 of flexure 458, and separates them. This permits bar 454 to rotate down onto landing 464 and outlet 466 to press on a contact valve.

In the embodiment shown, bar 454 is hollow and also provides a plumbing line for fluidic communication of the fuel. More specifically, outlet 466 opens to a contact valve, receives fuel from the contact valve into bar 454 when bar 454 is in the low position, and includes an internal channel that communicates the fluid through bar 454 towards the distal end where the channel turns upwards (FIG. 8C) to an outlet port 470 on the top surface of header 452 (FIG. 8D).

Bar 454 allows the mating connector to access fuel in the cartridge at a position that is offset from a center of the cartridge. As can be seen from other embodiments provided above, there is no restriction on where a mating connector receives fuel from a cartridge (e.g., top, side, off-center, etc.). Thus a cartridge of the present invention may be configured to provide outlet plumbing and any suitable position on a cartridge.

Although the present invention so far has discussed mechanical keys that enable access to the cartridge connector when the cartridge is connected to the device, other keys may be employed. In another embodiment, the key includes an electrical or magnetic interface that permits access to the cartridge connector when the cartridge is connected to the device, e.g., a magnet on the device permits access. In another embodiment, digital smarts on a memory included with the cartridge communicates with a controller on the device to enable a security handshake. For example, the digital key may include public/private encryption handshake between the device and cartridge, where the digital key is stored on a digital memory included with the cartridge. Without the digital key and handshake, the cartridge does not provide access to the fuel and/or the system pump does not move fuel. Other keyed access designs are also suitable for use herein.

A fuel cartridge can be pressurized or un-pressurized. A pressurized cartridge relies on pressure within main housing to move fuel out of the cartridge. An un-pressurized cartridge employs one or more pumps to draw fuel from the cartridge. More specifically, a pump may be required for each fuel line going into the fuel cell system. Some systems include double fuel line provision to a fuel processor burner and a fuel processor reformer. This relies on two metering pumps: one pump moves fuel into the reformer while the other moves fuel into the burner. These two pumps take space, add cost, and add complexity to a portable fuel cell system.

The fuel cell system typically also includes an air compressor to move air into the fuel cell. In another embodiment of the present invention, a fuel cell system relies on a pressurized cartridge. In this case, the cartridge includes some mechanism that pressurizes a bladder and forces fuel from the bladder.

FIGS. 9A-9D illustrate a system 500 for simplifying fuel delivery by using a pressurized fuel plenum. System 500 maintains positive pressure on fuel in a cartridge to supply fuel, which eliminates the need for liquid metering pumps to supply liquid fuel to either a fuel cell or a fuel processor. System 500 uses a supply of compressed air from an air compressor used in a fuel cell system. This allows a pump to continue to receive fuel even under higher ambient temperatures, and helps prevent vapor lock in the fuel pumps. Although fuel movement according to system 500 will now be described as an apparatus composed of units, those skilled in the art will recognize that the following description of fuel movement using a pressurized fuel plenum may also apply to a method of moving fuel from a fuel cartridge into a fuel cell system.

In this embodiment, a three-way valve 515 (FIG. 9D) is connected inline with the air-compressor outlet/fuel cell air inlet line. A third position on the valve is connected to the volume located in-between a fuel bladder and inner walls of a cartridge housing. Under normal operation, the line to the cartridge is closed and air flows from the compressor to the cathode (flow position). Periodically, this line is opened and the line from the valve to the cathode inlet is closed (pressure position).

Figure 9A:
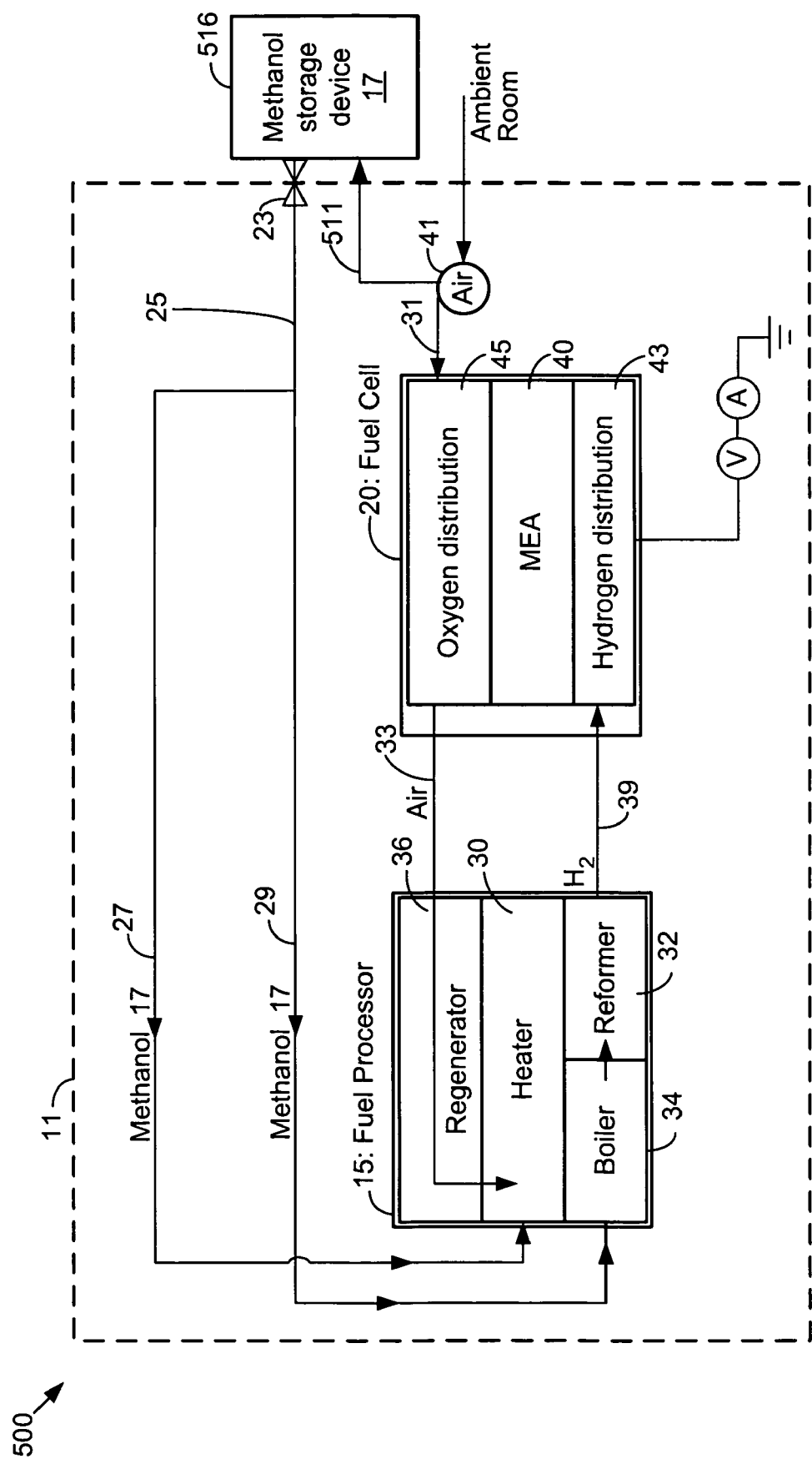
FIGS. 9A-9D illustrate a fuel cell system that uses compressed air in a package to pressurize a bladder in a cartridge in accordance with a specific embodiment of the present invention.

FIG. 9A illustrates schematic operation for the fuel cell system 500 in accordance with a specific embodiment of the present invention.

Cartridge 516 stores methanol. A connector 502 (FIG. 9B or 9C) provides fuel to a mating connector 23, which communicates methanol 17 into hydrogen fuel line 25, which is internal to package 11. Line 25 divides into two lines: a first line 27 that transports methanol 17 to a heater/heater 30 for fuel processor 15 and a second line 29 that transports methanol 17 for a reformer 32 in fuel processor 15. A flow restriction may also provided on each line 27 and 29 to facilitate sensor feedback and flow rate control.

Air source 41 moves air from the ambient room through line 31 into fuel cell system 500. As shown, air source 41 moves air to a cathode in fuel cell 20 where some oxygen is used in the cathode to generate electricity. Air source 41 also moves air to cartridge 516, which will be described in further detail below. Air source 41 may include a pump, fan, blower or compressor, for example. In a specific embodiment, a model BTC compressor as provided by Hargraves, N.C. is suitable to pressurize oxygen and air for fuel cell system 10.

High operating temperatures in fuel cell 20 heat the oxygen and air. In the embodiment shown, the heated oxygen and air is then transmitted from the fuel cell via line 33 to a regenerator 36 (also referred to herein as a 'dewar') of fuel processor 15, where the air is additionally heated (by the heater, while in the dewar) before entering heater 30. This double pre-heating increases efficiency of the fuel cell system 10 by a) reducing heat lost to reactants in heater 30 (such as fresh oxygen that would otherwise be near room temperature when combusted in the heater), and b) cooling the fuel cell during energy production.

Fuel processor 15 receives methanol 17 and outputs hydrogen. Fuel processor 15 comprises heater 30, reformer 32, boiler 34 and regenerator 36. Heater 30 (also referred to herein as a burner when it uses catalytic combustion to generate heat) includes an inlet that receives methanol 17 from line 27. Boiler 34 includes a boiler chamber having an inlet that receives methanol 17 from line 29. The boiler chamber is configured to receive heat from heater 30, via heat conduction through walls in monolithic structure 100 between the boiler 34 and heater 30, and use the heat to boil the methanol passing through the boiler chamber. Reformer 32 includes an inlet that receives heated methanol 17 from boiler 34. A catalyst in reformer 32 reacts with the methanol 17 to produce hydrogen and carbon dioxide; this reaction is endothermic and draws heat from heater 30. A hydrogen outlet of reformer 32 outputs hydrogen to line 39. Line 39 transports hydrogen (or 'reformats') from fuel processor 15 to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet port of fuel cell 20 receives oxygen from line 31; an oxygen intake manifold receives the oxygen from the port and delivers the oxygen to one or more bi-polar plates and their oxygen distribution channels. A cathode exhaust manifold collects gases from the oxygen distribution channels and delivers them to a cathode exhaust port and line 33, or to the ambient room. An anode exhaust manifold 38 collects gases from the hydrogen distribution channels, and in one embodiment, delivers the gases to the ambient room.

In addition to the components shown in shown in FIG. 1B, system 10 may also include other elements such as electronic controls, additional pumps and valves, added system sensors, manifolds, heat exchangers and electrical interconnects useful for carrying out functionality of a fuel cell system 10 that are known to one of skill in the art and omitted for sake of brevity. FIG. 1B shows one specific plumbing arrangement for a fuel cell system; other plumbing arrangements are suitable for use herein. For example, the heat transfer appendages 46, a heat exchanger and dewar 36 need not be included. Other alterations to system 10 are permissible, as one of skill in the art will appreciate.

Figure 9B:
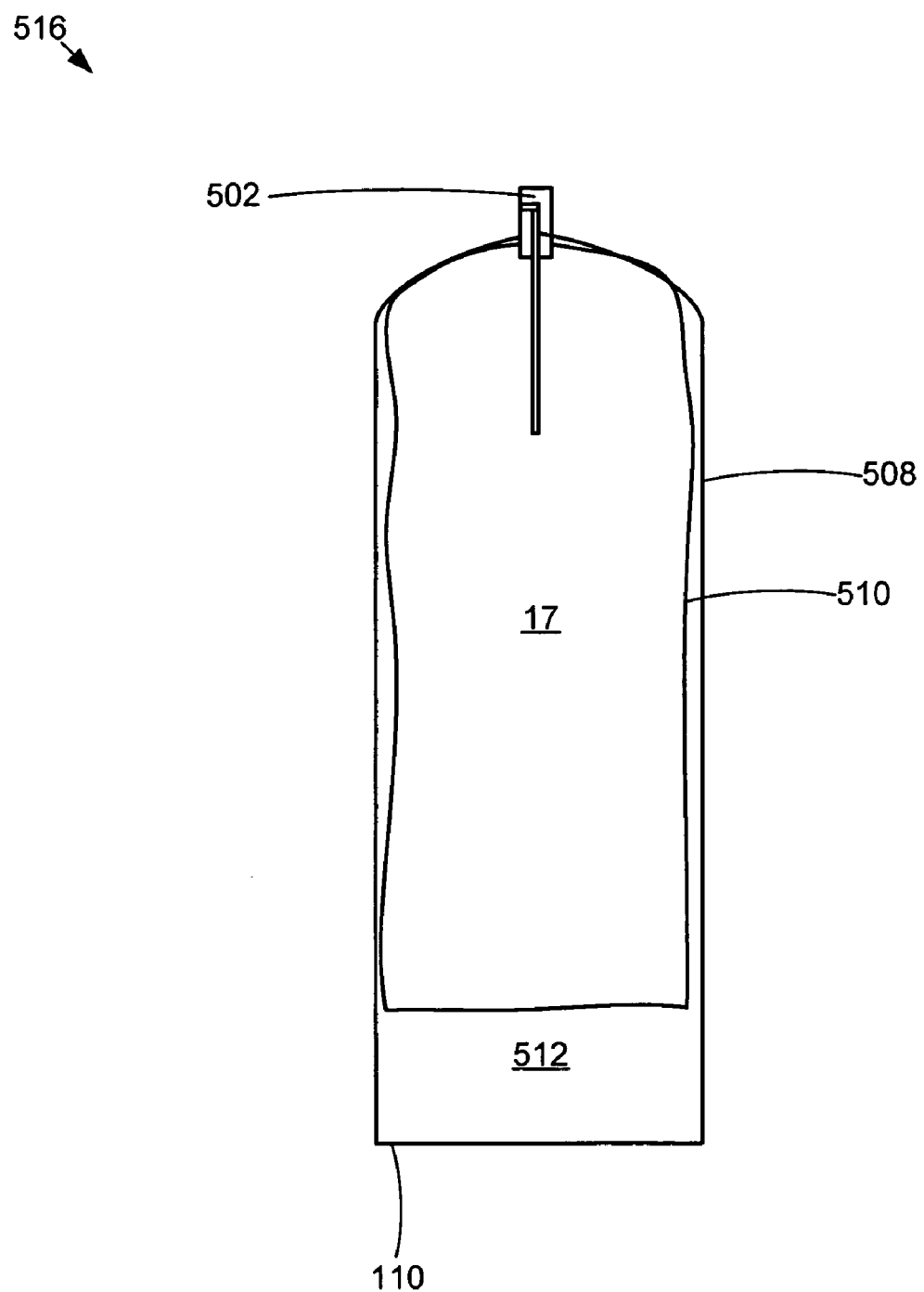
Figure 9C:
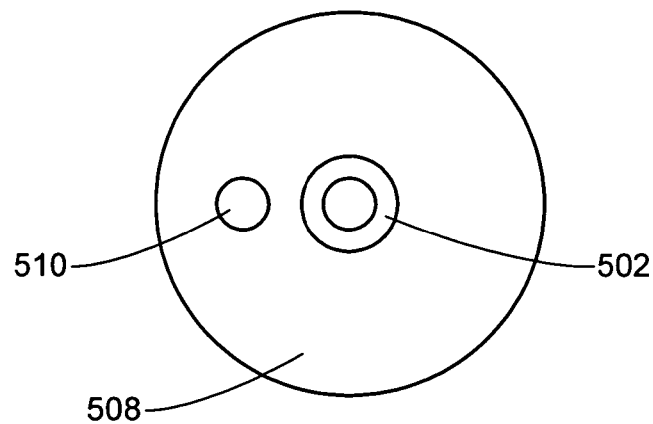
Figure 9D:
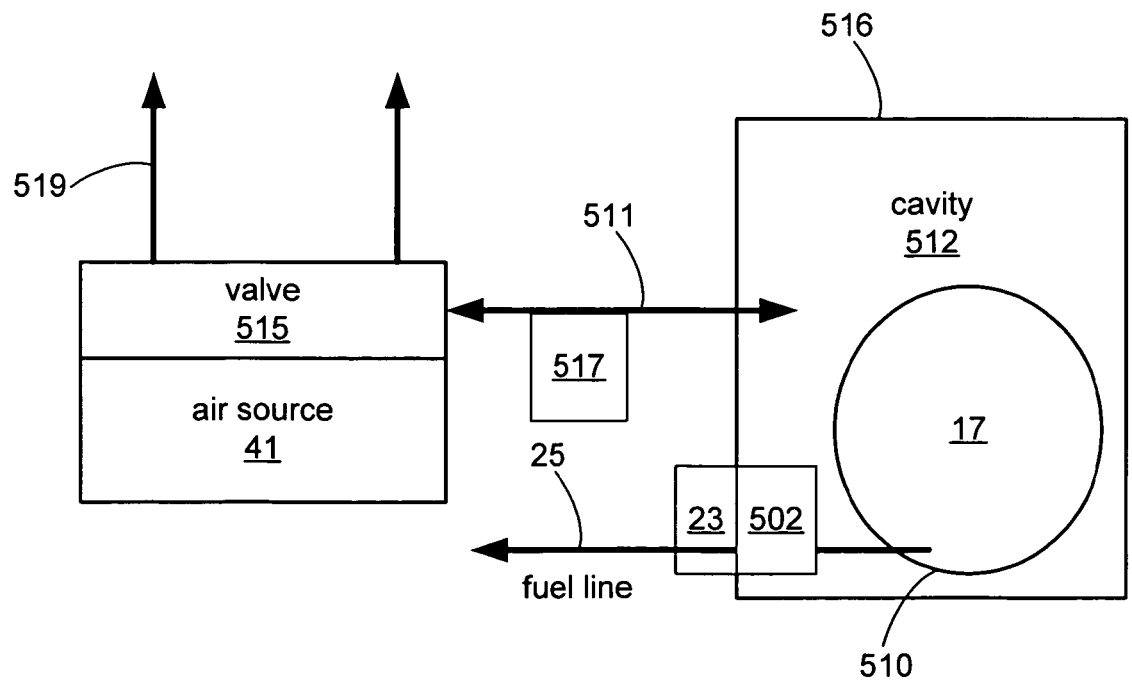

Referring now to FIG. 9B, cartridge 516 includes a rigid and sealed housing 508 and a fluidic connector 502 that allows cartridge 516 to be filled and fuel to be dispensed. Referring to FIG. 9C, housing 508 includes a hole 510 that permits an air inlet line 511 to transport air from compressor 41 into housing 508. The pressurized air then proceeds into an internal cavity 512 (FIG. 9B) between the inner surface of rigid housing 508 and the outer surface of bladder 510.

This provides positive pressure on fuel 17 so that fuel moves from cartridge 516 to package 11. More specifically, this permits a compressor 41 in a fuel cell system package to maintain a constant positive pressure on the liquid bearing bladder 510 (or bag) of sufficient pressure to move fuel 17 out of the bladder and into system 500. It may also isotropically pressurize fuel 17 so that the fuel exits through connector 502 irrespective of physical orientation of package 11 or cartridge 516.

In a specific embodiment, liquid fuel requires 2 about PSI to feed the system. Many suitable air compressors nominally run at 2 about PSI but have the ability to generate about 5 PSI. A three way valve 515 (FIG. 9D) and a pressure transducer 517 on the air line or the fuel line may be used to sense pressure and divert the air stream from the fuel cell 20 to the cartridge 516 as required to maintain 5 PSI. Three way valve 515 controls the direction of airflow provided by air source 41. A 5-volt model number LHLX0500050 valve as provided by The Lee Company of Westbrook, Conn. is suitable for use as three-way valve 515.

Under normal operation, line 511 to the cartridge is closed and air flows from the compressor to the cathode (flow position). Periodically, line 511 is opened and line 31 is closed (pressure position). The pressure position may be applied for about 0.25 to about 5 seconds, or until some desired cartridge pressure has been reached. In this position, the compressor reaches a stall pressure that is much higher than when it is normally flowing to the cathode. The pressure rise is a function of the compression ratio of the compressor, typically in the range of about 1.5 to about 10, resulting in pressures up to 150 psi, depending on the specific compressor design. In this manner, the fuel rail is pressurized sufficiently for fuel delivery to be maintained only with a valve or orifice, as opposed to a pump. During the pressure position actuation period, air is not delivered to the cathode and some small dropout in fuel cell power output may occur. However, active control over the fuel cell electrical output can prevent damage to the fuel cell, i.e. the fuel cell output is turned off if the voltage drops too low.

As the initial amount of free space in internal cavity 512 (FIG. 9B) is relatively small (it is initially filled almost entirely with fuel) it does not take more than a few seconds to pressurize the plenum in internal cavity 512 to about 5 PSI. Once the plenum pressure reaches 5 PSI, or some other suitable threshold pressure, three way valve 515 may close air supply to cartridge 516, which locks the plenum in internal cavity 512 at the threshold pressure. The plenum pressure may change as the temperature of the plenum changes or as fuel is consumed. Fuel consumption is relatively low (typically less than 1.5 ml/min), thus, "make-up" air balancing fuel loss may be supplied relatively infrequently.

When additional air is required to maintain the threshold pressure, the three way valve 515 may momentarily open line 511 to the fuel plenum in internal cavity 512 and close the line 519 to the fuel cell 20. Once the threshold pressure was reached, three way valve 515 returns to its normally closed position where line 511 is closed and line 519 to the fuel cell is open. A third line 519 also permits cooling airflow to the fuel cell, when desired.

Valve 515 may also be employed and programmed as a pressure relief valve. If internal pressure of the plenum in internal cavity 512 exceeded a predetermined value, a sensor disposed in cartridge 516 senses the excess pressure and valve 515 opens to relieve the pressure.

Another suitable pressurized embodiment includes a propellant included in the cartridge housing 508 and disposed between the outside of the bladder 510 and the inside of housing 508. The propellant pushes on bladder 510 according to a desired design pressure. The propellant may include a two-phase substance that includes a mix of gas and liquid at room temperature. As the volume of internal cavity 512 increases, the propellant increasingly becomes gaseous and maintains pressure on bladder 510. Suitable two-phase propellant may include nitrogen gas and liquid carbon dioxide for example. Other propellants may be used. Many propellants are commercially available from a wide variety of vendors (e.g., to power a nail gun).

While this invention has been described in terms of several preferred embodiments, there are alterations, permutations, and equivalents that fall within the scope of this invention which have been omitted for brevity's sake. For example, while latching interface 200 was discussed with respect to two contact valves, the present invention may include only a single contact valve, such as one of those described above. It is understood that the present invention need not include one or more heat transfer appendages. It is therefore intended that the scope of the invention should be determined with reference to the appended claims.

What is claimed is:

1. A portable cartridge for storing a fuel used in a fuel cell system, the portable cartridge comprising:
    a housing;
    a connector configured to interface with a mating connector to permit transfer of the fuel between the cartridge and a device that includes the mating connector;
    a sliding interface configured to cooperate with a mating sliding interface on the device to provide detachable mechanical coupling between the portable cartridge and the device such that the cartridge is linearly held along the sliding interface, wherein the sliding interface includes a linear member adapted to fit within a pair of opposing linear rails included in the mating sliding interface, and wherein the sliding interface and the mating sliding interface are adapted, when engaged, to permit relative motion between the portable cartridge and the device; and
    a cartridge latching interface configured to cooperate with a mating latching interface on the device to hold the cartridge in multiple positions along the sliding interface relative to the device, wherein the multiple positions include
        a first position that permits fluidic communication between the cartridge and the device, and
        a second position that does not permit fluidic communication between the cartridge and the device, wherein, in the second position, the cartridge latching interface maintains mechanical coupling without any force, in all directions except along the sliding interface, between the cartridge and the device by permitting one degree-of-freedom motion between the cartridge and device along the sliding interface, wherein the cartridge latching interface includes a set of female recesses adapted to receive a male latch positioned on the device to insert into one of the set of recesses, wherein the set of female recesses includes a first recess that provides the first position when the male latch on the device rests in the first recess and a second recess that provides the second position when the male latch on the device rests in the second recess,
    wherein the cartridge is moved from the first position to the second position and from the second position to the first position by retracting the male latch from a recess and sliding the cartridge relative to the device along the linear rails on the device, wherein the cartridge may be fully detached from the device by sliding the cartridge along the linear rails on the device.

2. The cartridge of claim 1 wherein the first position provides full mechanical coupling between the cartridge and the device and prevents the cartridge from moving relative to the device.

3. The cartridge of claim 1 wherein the cartridge latching interface is further configured to cooperate with the mating latching interface to permit a third position that provides partial mechanical coupling between the cartridge and the device.

4. The cartridge of claim 3 wherein the partial mechanical coupling permits the cartridge to slide relative to the device.

5. The cartridge of claim 1 further comprising a manual release adapted to decouple the cartridge latching interface from the mating latching interface on the device.

6. The cartridge of claim 1 further comprising an actuator adapted to decouple the cartridge latching interface from the mating latching interface on the device.

7. The cartridge of claim 1 further comprising a bladder, internal to the housing, adapted to contain the fuel and to conform to the volume of the fuel in the bladder.

8. A fuel cell system for producing electrical energy, the fuel cell system comprising:
    a device that includes a fuel cell, a device latching interface, a mating sliding interface and a mating connector;
    a cartridge that includes
        a housing,
        a connector configured to interface with a mating connector to permit transfer of the fuel between the cartridge and the mating connector
        a sliding interface configured to cooperate with the mating sliding interface on the device, wherein the sliding interface includes a linear member adapted to fit within a pair of opposing linear rails included in the mating sliding interface, and
        a cartridge latching interface configured to cooperate with the device latching interface so as to hold the cartridge in multiple positions relative to the device, wherein the multiple positions include a first position that permits fluidic communication between the cartridge and the device, and a second position that does not permit fluidic communication between the cartridge and the device, wherein the cartridge latching interface includes a set of female recesses adapted to receive a male latch positioned on the device to insert into one of the set of recesses, wherein the set of female recesses includes a first recess that provides the first position when the male latch on the device rests in the first recess and a second recess that provides the second position when the male latch on the device rests in the second recess,
    wherein the cartridge is moved from the first position to the second position and from the second position to the first position by retracting the male latch from a recess and sliding the cartridge relative to the device along the linear rails on an outside side of the device, wherein, in the second position, the cartridge latching interface maintains mechanical coupling without any force, in all directions except along the sliding interface, between the cartridge and the device by permitting one degree-of-freedom motion between the cartridge and device along the sliding interface;
    an actuator adapted to decouple the cartridge latching interface from the device latching interface, wherein the cartridge may be fully detached from the device by sliding the cartridge along the linear rails on the device; and a controller configured to send an instruction to the actuator to decouple the cartridge latching interface from the mating latching interface when the fuel cell is off.

9. The fuel cell system of claim 8 further comprising a manual actuator that permits a user to manually decouple the cartridge latching interface from the device latching interface.

10. The fuel cell system of claim 8 further comprising a spring that pushes the cartridge away from the device when the cartridge latching interface is decoupled from the device latching interface.

11. The fuel cell system of claim 8 wherein the controller is further configured to send an instruction to the actuator to decouple the cartridge latching interface from the device latching interface when a fuel processor included in the package is not processing fuel.

12. The fuel cell system of claim 8 wherein the controller is further configured to send an instruction to the actuator to decouple the cartridge latching interface from the device latching interface when there is a leak in the device.

13. The fuel cell system of claim 8 wherein the device is one of: a laptop computer or a portable fuel cell package.

14. The portable cartridge of claim 1, wherein the linear member is disposed along a side of the cartridge such that when the cartridge is moved between the first position and the second position and from the second position to the first position, the cartridge slides along an outside side of the device.

15. The fuel cell system of claim 8, wherein the linear member is disposed along a side of the cartridge and the linear rails are disposed along a side of the device such that when the cartridge slides along the linear rails, the cartridge slides along an outside side of the device.

* * * * *